(12) United States Patent
Schmidt et al.

(10) Patent No.: US 12,380,389 B2
(45) Date of Patent: *Aug. 5, 2025

(54) SYSTEMS AND METHODS FOR RISK DATA NAVIGATION

(71) Applicant: 1NTEGER, LLC, Santa Monica, CA (US)

(72) Inventors: Benjamin Schmidt, Santa Monica, CA (US); David Richard Elam, Santa Monica, CA (US); Juan Lopez-Martin, Madrid (ES)

(73) Assignee: 1NTEGER, LLC, Santa Monica, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 18/308,509

(22) Filed: Apr. 27, 2023

(65) Prior Publication Data

US 2024/0362563 A1    Oct. 31, 2024

(51) Int. Cl.
  *G06Q 10/00* (2023.01)
  *G06Q 10/0635* (2023.01)

(52) U.S. Cl.
  CPC .............................. *G06Q 10/0635* (2013.01)

(58) Field of Classification Search
  None
  See application file for complete search history.

(56) References Cited

U.S. PATENT DOCUMENTS

| | | | |
|---|---|---|---|
| 8,332,242 B1 * | 12/2012 | Medina, III | G06Q 40/08 705/35 |
| 8,620,929 B2 | 12/2013 | Shon et al. | |
| 9,450,771 B2 | 9/2016 | Browning et al. | |
| 9,619,772 B1 | 4/2017 | Adogla et al. | |
| 10,121,115 B2 | 11/2018 | Chrapko | |
| 10,803,414 B2 | 10/2020 | Shenoy | |
| 11,252,175 B2 | 2/2022 | Hassanzadeh et al. | |
| 2004/0054563 A1 | 3/2004 | Douglas | |
| 2007/0016542 A1 | 1/2007 | Rosauer et al. | |
| 2011/0010365 A1 | 1/2011 | Garcia et al. | |
| 2011/0161378 A1 | 6/2011 | Williamson | |
| 2015/0242779 A1 | 8/2015 | Hnatio | |

(Continued)

FOREIGN PATENT DOCUMENTS

| | | |
|---|---|---|
| CN | 112288328 | 1/2021 |
| CN | 113222737 | 8/2021 |

(Continued)

OTHER PUBLICATIONS

U Garg, G Sikka, LK Awasthi et al. (Empirical analysis of attack graphs for mitigating critical paths and vulnerabilities), Computers & Security, 2018—Elsevier (Year: 2018).*

(Continued)

*Primary Examiner* — Hafiz A Kassim
(74) *Attorney, Agent, or Firm* — Fox Rothschild LLP

(57) ABSTRACT

A computer implemented system, method, or computer readable medium for providing a interactive digital tool that permits users to investigate and evaluate financial, trade, and business-related risks. The system, method, or computer readable medium can be configured to include a software engine that identifies risk subgraphs or other subgraph features in accordance with automated traversal based on a set of rules.

24 Claims, 19 Drawing Sheets

(56) References Cited

U.S. PATENT DOCUMENTS

| | | | |
|---|---|---|---|
| 2016/0048938 | A1 | 2/2016 | Jones et al. |
| 2017/0076206 | A1 | 3/2017 | Lastras-Montano et al. |
| 2018/0075563 | A1 | 3/2018 | Ananthanpillai et al. |
| 2019/0095830 | A1 | 3/2019 | Epstein et al. |
| 2019/0287171 | A1 | 9/2019 | Parmar et al. |
| 2020/0160121 | A1 | 5/2020 | Parasrampuria et al. |
| 2020/0195673 | A1 | 6/2020 | Lee |
| 2021/0117978 | A1* | 4/2021 | Silva .................. G06Q 20/4016 |
| 2023/0075176 | A1 | 3/2023 | McCarthy et al. |

FOREIGN PATENT DOCUMENTS

| | | |
|---|---|---|
| CN | 114004435 | 2/2022 |
| CN | 114219287 | 3/2022 |
| WO | 202127317 | 2/2021 |
| WO | 202196370 | 5/2021 |

OTHER PUBLICATIONS

16. L Wang, S Jajodia, A Singhal, A Singhal, X Ou (Security risk analysis of enterprise networks using probabilistic attack graphs)—2017—Springer (Year: 2017).*

Jansen et al. (eds.), "The Multi-attribute Utility Method," The Measurement and Analysis of Housing, Chapter 5, Springer Science+Business Media B.V., pp. 101-125 (2011).

Roy et al., "Fast Best-Effort Search on Graphs with Multiple Attributes," ICDE 2016 Conference, pp. 1574-1575 (2016).

Garg et al., "Empirical analysis of attack graphs for mitigating critical paths and vulnerabilities," Computers & Security, 77, pp. 249-259 (2018).

Li and Leung, "Multi-objective route planning for dangerous goods using compromise programming," Journal of Geographical Systems, 13, pp. 249-271 (2011).

* cited by examiner

SYSTEMS AND METHODS FOR RISK DATA NAVIGATION

FIELD OF INVENTION

The present invention is generally directed to systems and methods for investigating and evaluating financial, trade, and other business-related risks including financial crime and sanctions-related risks.

BACKGROUND OF THE INVENTION

Today's corporations, financial institutions, and government agencies face a wide range of challenges stemming from issues at the intersection between international commerce and global security threats. Risk management professionals, investigators, and analysts require data and analytics on commercial actors that are implicated in global security threats to avoid excess risk and costs. For example, banking and financial systems are subject to complex regulations that can subject those institutions to significant fines, other regulatory penalties, reputational risk and other economic loss. Financial crime and sanctions-related risks can arise from directly or indirectly conducting or supporting financial transactions with entities under sanctions or otherwise engaged in illicit activity. These regulations can be complex and can involve identified entities and other entities that fall under sanctions by association. Other business-related risks may arise from trade controls or investment restrictions on restricted entities or jurisdictions and supply chain-focused security restrictions. Generally, such risks are referred to as financial, trade, and other business-related risks.

Various procedures and systems have been developed to assist in monitoring, investigating, and avoiding risks posed by global security threats. There are a number of existing systems, but thus far, they have been found to be inadequate in providing the institution with a cogent and quick representation of the risk as new situations arise. There is a tremendous amount of information, and understanding and assessing the information down to relevant parts has been difficult to achieve. The efficiency in providing such services, the way the information is interactively made available, and integrated algorithms that surface germane relationship or risks have also been inadequate. Another deficiency is that prior system are deficient in providing useful investigation tools in evaluating risk categories and their live and variable coexistence.

SUMMARY OF THE INVENTION

In accordance with principles of the invention, a computer implemented system for providing a visual interactive software tool that permits users to investigate and evaluate financial, trade, and business-related risks, comprising a computer system configured to include a database, risk propagation engine, and visual interactive graphical interface.

In one or more embodiments, the database is stored in nonvolatile memory and is configured to store graph data structures comprising a plurality of different types of nodes, edges, and related properties that are used by the system to build a graph, wherein the database stores information represented as nodes, edges, and related properties, wherein the related properties assigned to nodes are configured to include one or more risk categories and wherein the database is configured to allow one or more of the nodes to be designated to be seeds, wherein each seed is associated with one of the risk categories.

In one or more embodiments, the risk propagation engine is configured to apply a process to the graph that assigns one of a plurality of the risk categories and a corresponding value for the assigned risk category to a plurality of nodes, wherein the process comprises one or more defined risk propagation rules configured to adapt the graph to dynamically propagate and modify the corresponding values for the assigned risk categories, wherein the one or more defined risk propagation rules are configured, starting from individual seeds, to traverse through the graph following one or more paths comprising connected nodes and edges, and determine an exposure score for the risk category at a node in the traversed path as a function of the value of the risk assigned to the starting seed and, in some instances, also as a function of one or more interrelationships between two or more risk categories.

In one or more embodiments, the visual interactive graphical interface is configured to, responsive to the process and in response to a user selection of one or more of the risk categories and one or more of the nodes, display a subgraph, determined by the process, illustrating one or more paths of the selected risk category from one or more of the seeds, through nodes and edges and ending at the selected node and display the exposure score for the risk category at the selected node.

The visual interactive graphical interface may be configured to display two representations of the subgraph in which in a first representation the edges and nodes that together make up the subgraph are displayed and a second representation, based on an evaluation of the structure to eliminate paths, displays a simplified version of the subgraph. The visual interactive graphic interface may be configured to display an interactive list that identifies nodes and corresponding exposure score for the risk category. The system may be configured to add new risk categories to an existing node in the graph database. The system can be configured to select nodes to be target nodes and extract a subgraph starting from the seeds for a particular risk category to one of the target nodes.

The system may be configured to implement a limit on a maximum number of nodes traversed in the traversal from one of the seeds. The risk propagation engine can be configured to assign different weights to edges based on edge type.

The system may be configured to add or receive new nodes or updates to the graph database and automatically applies the rule propagation engine to adjust values for risk for the risk category determined at the nodes.

The function of one or more interrelationships between two or more risk categories is configured to detect whether the subgraph or traversed path includes an overlapping seed for another risk category and configures the risk propagation engine to apply a factor to the exposure score at that node that adjusts the exposure score.

Corresponding or related systems, methods, and computer readable medium are contemplated.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION OF THE INVENTION

Figure 1:
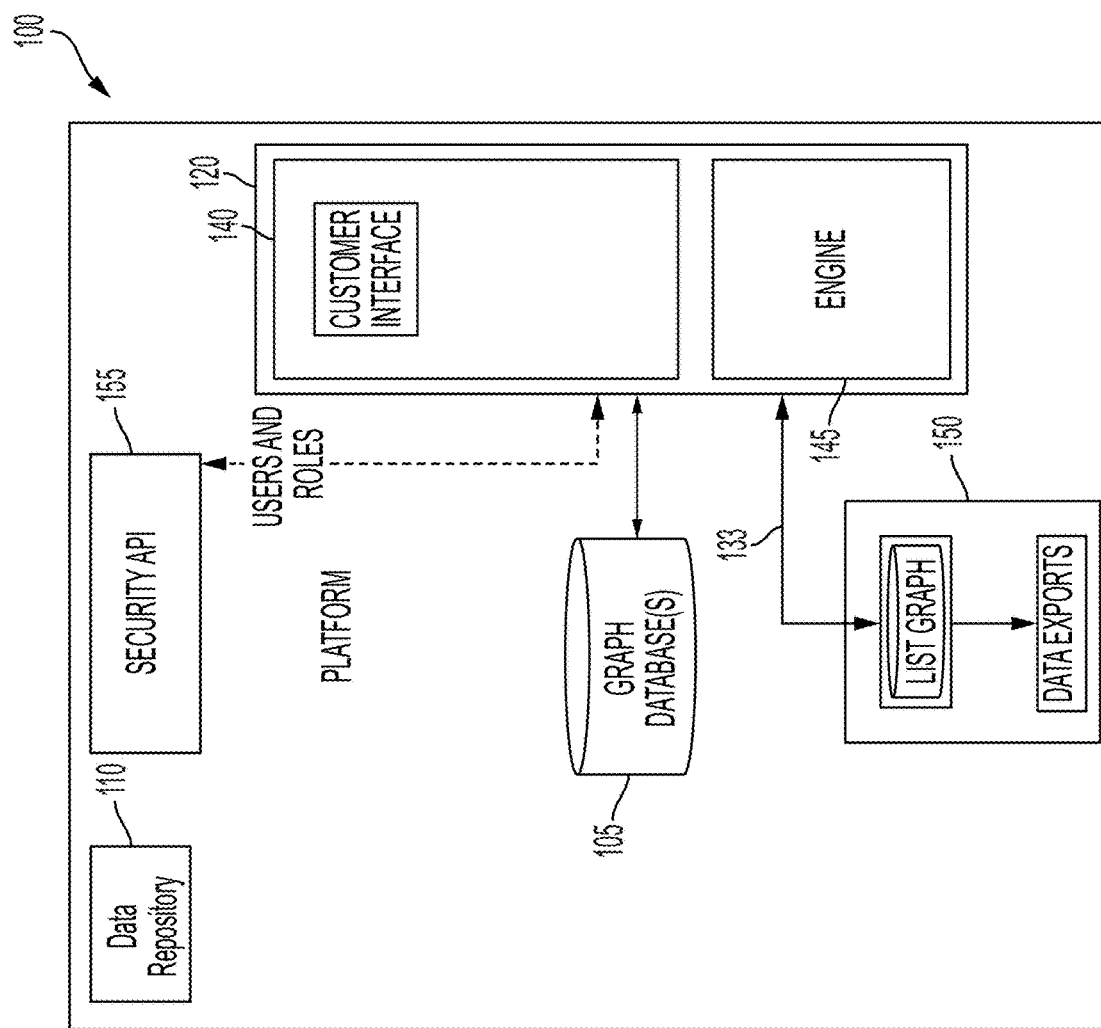
FIG. 1 depicts an illustrative computer-implemented system for providing a visual interactive software tool that permits user to investigate financial, trade, and other business-related risks in accordance with some embodiments of the present invention.

Embodiments of the present invention are directed to improvements in the field of interactive electronic investigation systems and in particular to interactive electronic risk investigation systems. Such systems are actively being developed to provide tools, information, guidance, and resources for users to interact via a dedicated platform to investigate, find, and comprehend financial, trade, and other business risk, where the risk is related to past or future activity. As can be well understood, the number of entities, activities, resources, rules or regulations, and known relationships (direct or indirect) is massive and complex. In addition, in each particular situation (such as proposed involvement with an individual), the greater the size and detail of the generally available information, the more difficult to know or detect risk related relationships or activities through known standard methods. Interactive platforms integrating advanced tools such as interactive guided or aided tools can be implemented. These can provide fluid and distilled outcomes on the platform while maintaining valuable content, access to content, and a large data set of underlying information. It can be important to the user for the platform including the visual interface to provide rapid discovery and recognition such as with respect to germane relationships (or paths) and/or risk propagation without potentially eliminating important information. The balance can be important to the usefulness of the digital tool in the field of application. The development and construction of such interactive and/or integrated systems are important and successful solutions materially add to the growth and technology in this field. As mentioned, the platform or system can, for example, combine advanced processing such as a graph schema, a software engine, automated multidimensional rendering of risk, and improved user interface tools to advance this field.

At a high level, a software platform can be configured to map entities, relationships, and characteristics of financial, trade, and other business networks such as the commercial, financial, and facilitation networks of sanctioned or other actors that may be associated with illicit activity. Through embodiments of the present invention, financial institutions, multinational corporations, legal professionals, investors, and other stakeholders can access visual graphs depicting relationships between relevant actors in order to evaluate their possible exposure to financial, trade, or other business-related risks. For example, such stakeholders can access visual graphs depicting relationships between sanctioned and non-sanctioned actors in order to evaluate their possible exposure to financial crime or sanctions-related risks. Embodiments illustrated herein are directed to financial crime and sanctions-related solutions and have particular suitability to solving and assisting users with financial crime and sanctions compliance related issues but are also applicable in other ways to financial, trade, and other business risks. For example, constructs for situations similar to sanctioned and non-sanctioned entity relationships can exist. It should be understood that the present features or systems can have broader or different applications.

With respect to the application to sanctions, sanctions refers to laws or regulations issued by a government that places commercial restrictions on certain identified entities or entities that are described in more general terms or indirectly (e.g., all subsidiaries of an entity that is specifically identified) and also place restrictions on commercial activities involving the restricted entities. Individuals, companies, or organizations that violate the restrictions are subject to civil or criminal penalties, which can be a significant source of risk, typically arising from being a primary or secondary actor in a financial or commercial transaction. In the United States, government organizations involved in issuing and enforcing such regulations include the Department of the Treasury, the Department of State, the Department of Commerce, and the Department of Justice, but others exist in the U.S. and in other countries.

The investigation of actions or relationships involving financial, trade, or other business activity such as sanctions, financial crime, or other similar activity using a software platform for conducting financial crimes and trade compliance is an established niche area and, as mentioned, is a field of development. From an investigation and process perspective, the field can be demanding in the amount of information to evaluate, the volume of transactions to consider, the time to carry out the process, and amount of visual or navigational interaction and information. New aided analysis and navigation tools that are supported by automated traversal tools and, potentially, risk propagation tools that interact with each other can provide improved features to the field of development.

The tools can, for example, allow the software platform to discover entities (nodes) in the graph through traversal that meet certain traversal rules based on edge type stemming from a node of interest and in response, display a graphical element in close association with the discovered node. The graphical element can be interactive and can include information communicating that the node was found in a specialized automated discovery procedure, using traversal rules, and can also display that the node (if applicable) is discovered to meet multiple traversal rules. This is available at the same time for example as a visual interactive tool to add corridors, subgraphs, or paths to the current visual workspace. A subgraph means a graph obtained or extracted from the information stored in the graph database or from the overall graph constructed using a subset of the information stored in the graph database. In some embodiments, a computer aided risk modeling and assessment tool can be implemented that provides the user with computer aided emulation and assistance in quantifying or identifying germane risk relationships arising from defined risk categories. Considering the tremendous volume of information in this field, enhanced tools that provide quick value to the user in the surfacing, investigation and assessment of risk can be critical to the success of the user and adoption of the platform.

The present application includes discussion of various embodiments including a discussion of embodiments related to a feature referred to as a corridor feature (or corridors), which has also been discussed in prior applications by the applicant, and discussion of embodiments related to a feature referred to herein as a cognition feature. With respect to the cognition feature, the platform provides an interactive computer aided risk identification, assessment and investigation tool. The cognition feature uses a risk propagation framework that is configured to include a set of risk propagation rules. These rules are configured to emulate by way of exercising the rules including defined values and related processes, how risk emanates from an entity that is the source of a risk topic to other entities. The rules define a risk propagation software model that is configured to quantify an emulation of the risk propagation, by way of entity-entity relationships, relationship types, attributes, and potentially the type of risk category, as understood by experts (or potentially those in a particular field of specialization).

Today's world comprises a dynamic series of events that over time regularly reveal new categories of financial risk while existing categories or themes of risk lose their threat or disappear. The cognition feature configures the platform to be able add new categories or themes to an existing and developing graph database. It can allow for a dynamic evolution of risk categories. The graph database may have defined node types and edge types, and the platform may have added a large data set into the graph database in accordance with the graph schema. The platform can be configured to define and add risk categories and assign each risk category to certain nodes in the graph database. This risk category that is added can be a new node attribute or tag for nodes. The risk categories can be assigned to certain nodes that are the source of risk for that category. The assignment can be automatically made using an algorithm, by a user (such as an expert familiar with that risk category), or a combination thereof. This process seeds the graph with designated nodes for different risk categories. In implementation, the seeds increase in number in the graph, in a potentially competing way, under a specified set of rules to populate the graph with additional characteristics or resulting features. Seeds are sometimes referred to herein as source nodes and are interchangeable. The platform is also configured to allow the selection of target nodes (in association with source nodes of a corresponding risk category). The cognition feature performs a process including algorithms that traverse the graph database from the source nodes through connected edges to find a risk subgraph of the graph that includes (all) paths from all source nodes for that risk category to a particular target node. The subgraph can be generated for each target node. The algorithm can perform in a sequential and cumulative way to apply a risk propagation model that quantifies the risk value for that risk category at the target node (and records the subgraphs and values). This way new risk categories can be added and be available in the graph database. As a point of potential clarification, a node of interest, as discussed with respect to the corridors feature, can be a seed (which is sometimes also referred to as a seed node) in the cognition feature.

For example, the platform can be configured to have a risk category of human rights offenders. Nodes in the graph database for individuals that are human rights offenders and for companies that are wholly owned by a human rights offender can be selected to be source nodes for the human rights offenders risk category. Certain other node(s) can be selected to be target nodes such as company A. Using the Cognition feature, the platform can find the paths from the human rights offender node(s) to the company A node and determine a risk value to assign to company A for the human rights offender risk category. The platform can allow the user to select to view, on a visual (workspace) interface, a subgraph that visualizes the nodes and edges from the source nodes to the human rights offender node. If desired, the platform can be configured to allow the user to interact with the subgraph to add other nodes, edges, paths, corridors, or subgraphs to the workspace and automatically interconnect one or more nodes when they are added if they have an existing direct edge connection to a node in the workspace.

With respect to the corridors feature, the corridors feature is configured to find a path from a starting node to corridor endpoint nodes, which are for example entities that are sanctioned entities. The corridors feature finds a route from a node that is not a corridor endpoint to a corridor endpoint node and the platform is configured to provide the user with the information to allow the user to select corridors and evaluate in a visual workspace. Variations in implementation are contemplated. Multiple corridors can be found by way of the traversal process such as by traversing all of the connections of a particular node to find paths to any corridor endpoint nodes (e.g., sanctioned nodes). As noted, the traversal may include rules that limit the number of traversals or apply other rules that identifies which paths are determined to be corridors. As is evident, the corridor feature finds paths involving consecutively connected nodes and edges while the cognition feature can find an individual path but is configured to find the subset of the graph database that comprises the source nodes and connected paths (e.g., all connected paths which may be subject to the rules such as a maximum traversal rule) that reach and connect to the target node (that is the current particular subject of the process). The cognition feature is also configured to be potentially a layer of additional context over the graph, that is used in combination with the corridor feature, by way of the user being able to add tags or topics to the graph database. The cognition feature is configured to emulate the risk propagation that would be understood (or estimated) by an expert to occur and assigns a risk value to a particular target node as a cumulative function of weights implemented in a risk propagation model and the multiple paths that are traversed to reach the target node. Both features provide valuable digital tools that express complex underlying data that surfaces information or visual depictions (relevant to the user in different investigative ways), as a function of the features of the graph database. They are configured to allow the user to visualize and understand different features or insights in the graph database that otherwise could be difficult or time-consuming to discover.

FIG. 1 depicts an illustrative computer-implemented system 100 for providing a visual interactive software tool that permits users to evaluate financial, trade, and other business risks. The below described implementations are sometimes directed to financial crime and sanctions-related risks, but the application to other financial, trade, and business risk is understood. The system 100 comprises a graph database 105 configured to store nodes, edges, and properties, a data repository 110 configured to communicate with different sources over a network to receive financial crime and sanctions-related risk information and save received information used by analysts and automated processes to create nodes, edges, and properties, a production environment 120 configured to interact with customers. It would be evident that this is one implementation and variations are contemplated.

The graph databases 105 may include an internal graph database and an external graph database. The graph database is configured to store nodes, edges, and properties inputted into the system 100, store nodes, edges, and properties for access and use by automated processes and store other information entered and produced from the inputted nodes, edges, or properties. The information produced may be information created using the nodes, edges, and properties (e.g., connections and corridors). System 100 may have a process such as an automated process that adds nodes, edges, properties or other data to the graph (e.g., from the internal graph database). System 100 may be configured for example to include a graph database 105 such that system 100 adds or updates the graph database from various sources based on automation (e.g., using a set of configured rules), manual entry, or variations and can do so with or without requiring a preliminary (internal) graph database. The graph database 105 is configured to store nodes and edges for customers' use in the production environment 120 and store visual graphs produced and saved by customers in the production environment 120. The graph database 105 may be a component separate from the production environment 120 or be integrated with the production environment 120. The system 100 is configured to logically divide or secure (e.g., by a mechanism such as user authentication executed by subsystem 155) the production environment 120, wherein customers are only permitted to access or interact with nodes or edges in the graph database (in graph database 105) and authorized features for that customer.

A node represents a subject. The system 100 is configured to allow for the subject to be an individual, entity, postal address, e-mail address, event, number, telephone number, campaign, or other subject. In the application to sanctions and financial crime, the subject may be one that appears on a sanctions list or one that faces similar government imposed restrictions (sanctioned subject), one that is materially associated with a sanctioned subject but does not appear on a sanctions list (associated subject), or one that is neutrally associated with a sanctioned subject or an associated subject and does not appear on a sanctions list (neutral subject). A node is described by properties that include one or more words, numbers, symbols, or a combination thereof by which the underlying subject is known or referred to. When the subject (or property) is a number, the number may be a phone number, fax number, driver license number, social security number, passport number, bank account number (including credit card and debit card account numbers), identification number used by the system 100, or other number.

Figure 2:
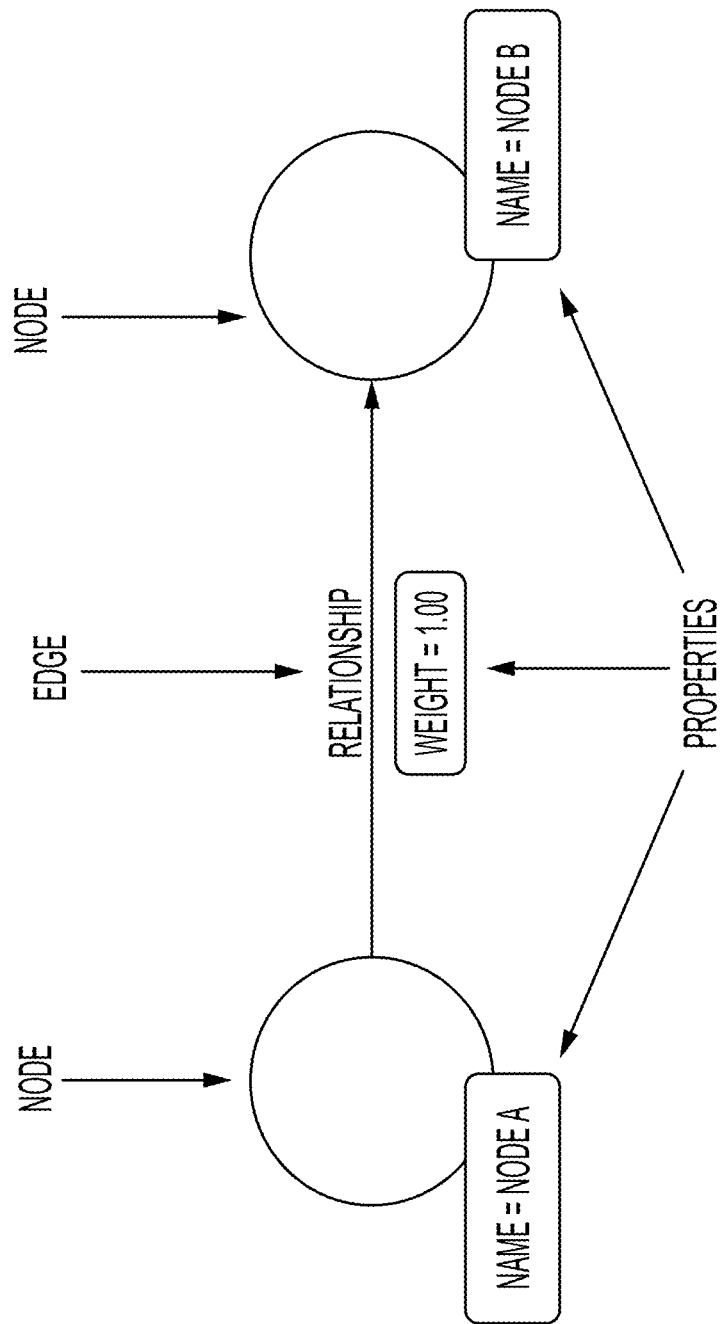
FIG. 2 depicts illustrative nodes, properties, and an edge and their respective roles in accordance with some embodiments of the present invention.

An edge represents a relationship between two nodes. The relationship may be a business relationship (e.g., creditor, supplier, joint-venture, etc.), an ownership relationship (e.g., majority shareholder, minority shareholder, subsidiary, etc.), a position relationship (e.g., director, manager, owner, etc.), a banking relationship (e.g., account holder, mortgagor, etc.), a familial relationship (e.g., father, daughter, cousin, etc.), and other relationships. An edge is described by properties that include one or more words, numbers, symbols, or a combination thereof by which the underlying subject is known or referred to. FIG. 2 depicts an illustrative node, property, and edge and their respective roles.

FIG. 2 depicts a graphical structure of the node, property, and edge that is presented to a user when he or she assembles them through the workspace in the production environment. The graph database 105 stores nodes, edges, and information in nonvolatile memory. Nodes and edges are part of a graph database and can also have a graphical representation as part of a user interface.

As would be understood, a range of variations and combinations are contemplated such that the features or components of the system can interact and support each other or be available if desired. The system 100 can create particular nodes or edges (and related properties) from one or more sources of data in accordance with a model, ontology, or structure such as by the system receiving or applying a data ontology to a set of received data into the system 100. The system 100 can be configured to communicate with many different data sources and perform manual or automated operations to process and add the data from the different data sources to the graph database 105 in accordance with one or more corresponding data ontologies. In automated form, for example, data from a certain source is known by the system to be structured and the system can automatically perform operations to add the data to the graph database.

Data repository 110 can be included in the system to receive and store for retrieval structured, unstructured, and partially structured data or information from various sources. Data repository 110 can be configured to be a data lake, which is defined as a centralized repository designed to store, process, and secure large amounts of structured, semi structured, and unstructured data. It can store data in its native format and process any variety of it. The data repository 110 communicates with different data sources over a network to receive information such as financial crime and sanctions related information. Data sources may include government sanctions lists, court records, records of incorporation, corporate filings, shipping records, news, websites, public social media postings, multi-media, and other sources. The information is used by the system 100 to create or input a node and related properties in graph database 105. Information in the data repository can include supporting information (including links or text of webpages) that provide underlying evidence of the nodes and edges that are added to the graph database 105. For example, data received from Securities and Exchange Commission filings with the government can be used to generate nodes and edges in the graph database 105 and the data repository 110 can store or provide access to the related government documents or company filings. This can allow the system 100 to permit customers to retrieve for display from the system 100 the specific documents that are the source of the graph configuration. In this way, entered nodes, edges, and/or properties can be checked for accuracy or evaluated in context by reviewing the actual received information directly (instead of just the nodes, edges, and properties) if necessary. For example, the received information may include a legal filing (or other source), a link to the legal filing, or information about the legal filing.

The system 100 can automatically add nodes and related properties using data in the data repository 110. The system 100 can use one or more data models or data ontologies adapted for the field of application to add data from the data repository 110 as nodes and/or related properties.

A node can be identified as a node of interest. Once a node is identified as being a node of interest, the system can as a result, designate it as a corridor endpoint node. For example, the system can identify whether an entity of a node is found on a sanctions list and the system can record that in the system and select to make one or more (all) sanctioned nodes to be individual points of interest. The designation imparts to the inputted node different characteristics and effects that enables the software engine 135 to find paths and corridors (further discussed below) accordingly and that allows the electronic online platform of the production environment 120 to generate a visual graphic as a distinct representation. A node can be identified to be a node of interest by the system automatically or designated manually. System 100 can review the inputted nodes against one or more criteria and data in the data repository to identify which inputted nodes are to be identified as a node of interest. For example, an inputted node can be identified as appearing on a sanction list. Also, by way of example, a node of interest can be identified by the system using data in the data repository to determine which inputted nodes are state owned, are located in a particular city, or develop certain technology. The resulting entities may not be a sanctioned entity (directly or indirectly), but the identified nodes can provide an additional strategy for visually investigating risk such as through relationships or network of activities.

A node can also be created to represent a legal filing or other data that serves as a source for additions. In some situations, this type of node is configured not to have a graphical node inserted into a workspace.

The system can allow the addition of a second category of information specifying an edge and related properties between inputted nodes. The system 100 can automatically add edges and related properties using data in the data repository. The system 100 can use one or more data models or data ontologies adapted for the field of application to add data from the data repository 110 as edges and/or related properties between inputted nodes. In some embodiments, adding a certain node and/or specifying the type and direction of the relationship between two nodes in the graph database 105 may cause the system 100 to automatically select a certain relationship between that certain inputted node and another inputted node and store that relationship in the graph database for those nodes. The relationship selected by the system 100 may be a mandatory relationship. In some embodiments, specifying a certain relationship may cause the system 100 to automatically change or specify the type of node (e.g., source or corridor endpoint node). The type of node selected by the system 100 may be a mandatory type of node.

The first category of information and the second category of information are stored in the graph database 105 and can be accessed by the workspace.

The system 100 can include a first subsystem that is configured to store and provide one or more defined data models or data ontologies (generally referred to as data ontologies) adapted for nodes and edges in the application. A data ontology can refer to data mappings, a graph data structure, or to categories or types of data for entry into the graph database. In general, the data ontology is user defined. In simple applications, data from certain data sources may be structured or primarily structured at the source (e.g., upon transfer to system 100) and the system 100 can define a data ontology that applies to the data structure of the data source (e.g., provide corresponding translation, transformation, or modification to successfully ingest the data into system 100 for use in system 100 investigation and operable use). The system can use the information and ontology to determine nodes, edges, and other characteristics for the graph database 105. The system can be configured to automatically receive data from a data source and automatically apply such a process to ingest data into the graph database 105 in accordance with a corresponding data ontology.

A data ontology can govern what and how each piece of information is added to the graph database 105. It can govern how information is added in relationship to a node and specify the relationship between nodes and can relate the entered information to a node in the graph database 105 based on information in the entered information. It can determine how the entered information should be linked to or integrated with the node if the entered information is related. In some embodiments, a data ontology may be available as a template for entering the first and/or second category of information. In some embodiments, the system 100 can automatically select the appropriate data ontology to use for received data into the system 100. The data ontology may include the corresponding fields and the required data structure and format so that the system 100 or the graph database 105 can be built and maintained uniformly across all users and processes involved in populating data in the graph database. Thus, for example providing automated graph generation based on the data ontology. The data models can also be created for other situations.

The system is configured to allow collaboration. The system can be configured to have many automated graph generation processes and users to interact and save their work on the system. The system can be configured to allow users to share their work and to build on that work (efficiently building a larger and more complex set of information). For example, the system 100 is built with a database storing information that visually identifies direct and indirect relationships between an actor that does not appear on a list (e.g., a sanctions list) and other actors that do appear on the list. The system 100 can add additional actors or nodes to the database to continue the direct and indirect relationships and/or new actors or nodes to the database to create new direct and indirect relationships that are not already in the database. The system 100 can include an approval or transition process for new information that is being added to the production environment. The process can be configured as an automated process involving a workflow in which the system specifies that a new set of subjects or relationships are being added to the system and in response, an automated approval or transition process is implemented that can involve a trigger based on automated or manual approval adding or updating the graph database with the new additions. For example, a daily update from a government database can be received into the system 100 and the system 100 applies processes to the update such as to apply a data ontology to model the received data and apply other processes as necessary. In response, the system 100 updates the graph database available to customers to include the new nodes and relationship and may also perform additional automated processing such as identifying and updating customer navigation and research tools.

The software engine 145 includes a set of computer implemented rules (generally referred to as rules) that are configured to traverse paths and find ("surface") a subset of the paths that meet certain rules (and therefore, eliminate other paths) and also configured to emulate and quantify risk relationship in association with defined risk categories.

The subset that meets the rules is referred to herein as corridors. The software engine 145 is configured to find or identify corridors based on the stored first and second category of information. A corridor is a pathway connecting any node that is not a corridor endpoint node to a node that is designated as a corridor endpoint node via one or more edges and/or one or more connecting nodes. A connecting node can be any node except a node designated as a corridor endpoint node and/or other nodes deemed to have no value in the traversal (e.g., having low or no illicit finance or sanctions-related risk relevance for the purpose of corridor generation because the node has a large number of connections). The system 100 may be configured to specify whether an added node is a corridor endpoint node or some other kind of node (e.g., a node that has no risk relevance or low risk relevance for the purpose of corridor generation, or other specificity with respect to the type of node can for example be determined by the software engine 145 based on the edges or paths connected to that node). The system 100 can automatically specify nodes to be points of interest by applying a process such as by determining whether the node is on a list (e.g., a sanctions or trade restrictions list) or applying a plurality of criteria. At a base level, a corridor is determined (found) by identifying a node (that is not a corridor endpoint node) from the first category of information and connecting the identified node to a designated corridor endpoint node in the first category of information via a direct edge connection or via other nodes in the first category of information and the edges in the second category of information. Rules are incorporated into the software engine 145 that traverses or finds paths from identified nodes to designated corridor endpoint nodes and finds corridors as a subset of all paths where a path from an identified node can be traversed by the software engine 145 to reach a designated corridor endpoint node. In operation, the software engine 145 automatically traverses from the identified node through connected nodes and edges until it reaches a designated corridor endpoint node. A corridor endpoint node is a type of node that is specified or designated within the system as having different properties than other nodes. A corridor endpoint node cannot be the starting point of a corridor and is only available to end a pathway or corridor. The corridor endpoint node is defined by the system 100 (e.g., by rules, configurations, and/or data structures and ontologies) to function that way with respect to identified nodes. A corridor is found when the identified node is connected to a corridor endpoint node and also certain rules are satisfied. A corridor can be graphically illustrated by the system 100 (e.g., as part of the graphical user interface) using a graphical structure comprising the connected nodes, edges and corridor endpoint node that form the corridor. Subject to meeting certain additional rules (discussed herein) a corridor can be identified by the software engine 145 whenever an identified node can reach a corridor endpoint node. Multiple corridors can be generated for an identified node. The multiple corridors may be pathways between an identified node and a corridor endpoint node, between an identified node and multiple corridor endpoint nodes, or a combination thereof. The software engine (or components thereof) can directly or indirectly interact with the customer using the application interface to support the customer facing aspect of the system.

Figure 3:
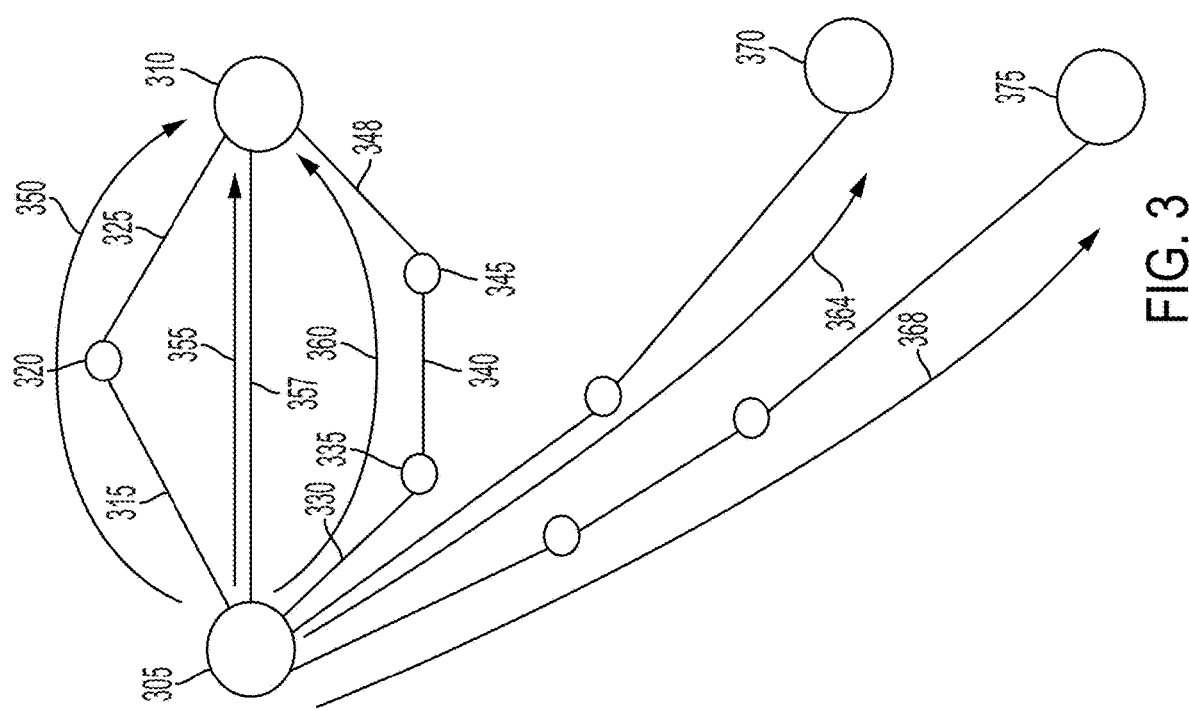
FIG. 3 depicts illustrative corridors in accordance with some embodiments of the present invention.

FIG. 3 depicts illustrative corridors 350, 355, 360, 364, 368. As mentioned above, a corridor is a pathway between a graph node and a corridor endpoint node that meets certain rule requirements. For discussion purposes, in connection with FIG. 3, corridors are discussed in more general terms and additional specificity is discussed further below. The corridors 350, 355, 360 represent pathways between a graph node 305 and a corridor endpoint node 310. The corridor 350 includes an edge 315 joining the graph node 305 and a connecting node 320, a connecting node 320, and an edge 325 joining the connecting node 320 and the corridor endpoint node 310. The corridor 355 is an edge 357 between the graph node 305 and corridor endpoint node 310. The corridor 360 includes an edge 330 joining the graph node 305 and a connecting node 335, a connecting node 335, an edge 340 joining the graph node 335 and a connecting node 345, a connecting node 345, and an edge 348 joining the connecting node 345 and the corridor endpoint node 310. The corridor 364 represents a pathway between the same graph node 305 and a different corridor endpoint node 370. The corridor 368 represents a pathway between the same graph node 305 and another different corridor endpoint node 375. The software engine 135 may not generate corridors for some of the graph nodes since not all the graph nodes can be connected to a corridor endpoint node.

The software engine 145 can be programmed with a maximum number of degrees of node-traversal. The maximum number of degrees of node-traversal refers to the number of nodes in a pathway the software engine 145 is permitted (by rule) to traverse to reach a corridor endpoint node from a particular graph node. The software engine 145 can end the node traversal, exit the traversed pathway, and eliminate that traversed pathway from qualifying as a corridor when the software engine 145 determines that the current traversed node is equal to the maximum number of degrees of node-traversal. The software engine 145 is configured to eliminate a pathway when the number of nodes in the path (after the graph node) reaches a maximum. The maximum can be specified internal to the system and not otherwise visible to users when interacting with the system. The maximum can, for example, be selected to be one of 4, 5, 6, 7, or 8 nodes, which can have advantages in processing, relevancy, and presentation. Other maximums are contemplated. With this rule, the software engine 145 prevents pathways that exceed the maximum number of degrees of node-traversal from qualifying to be corridors. If the software engine 145 has reached the maximum number and no corridor endpoint node is found, then the software engine 145 moves onto traversing another pathway (e.g., which can start from the same graph node again if that graph node has other pathways or from the next graph node) to find a corridor endpoint node. Since the graph database 105 may store a large number of nodes and edges, their combinations may produce an enormous number of pathways. The maximum number can control the number of iterations performed by the software engine 145 to save processing time and power consumption. For brevity, the term maximum number of degrees of node-traversal is sometimes referred to or abbreviated as the maximum number, the maximum number of node traversal, the maximum number of node traversal or degrees of traversal, or the maximum number of traversal nodes.

Figure 4:
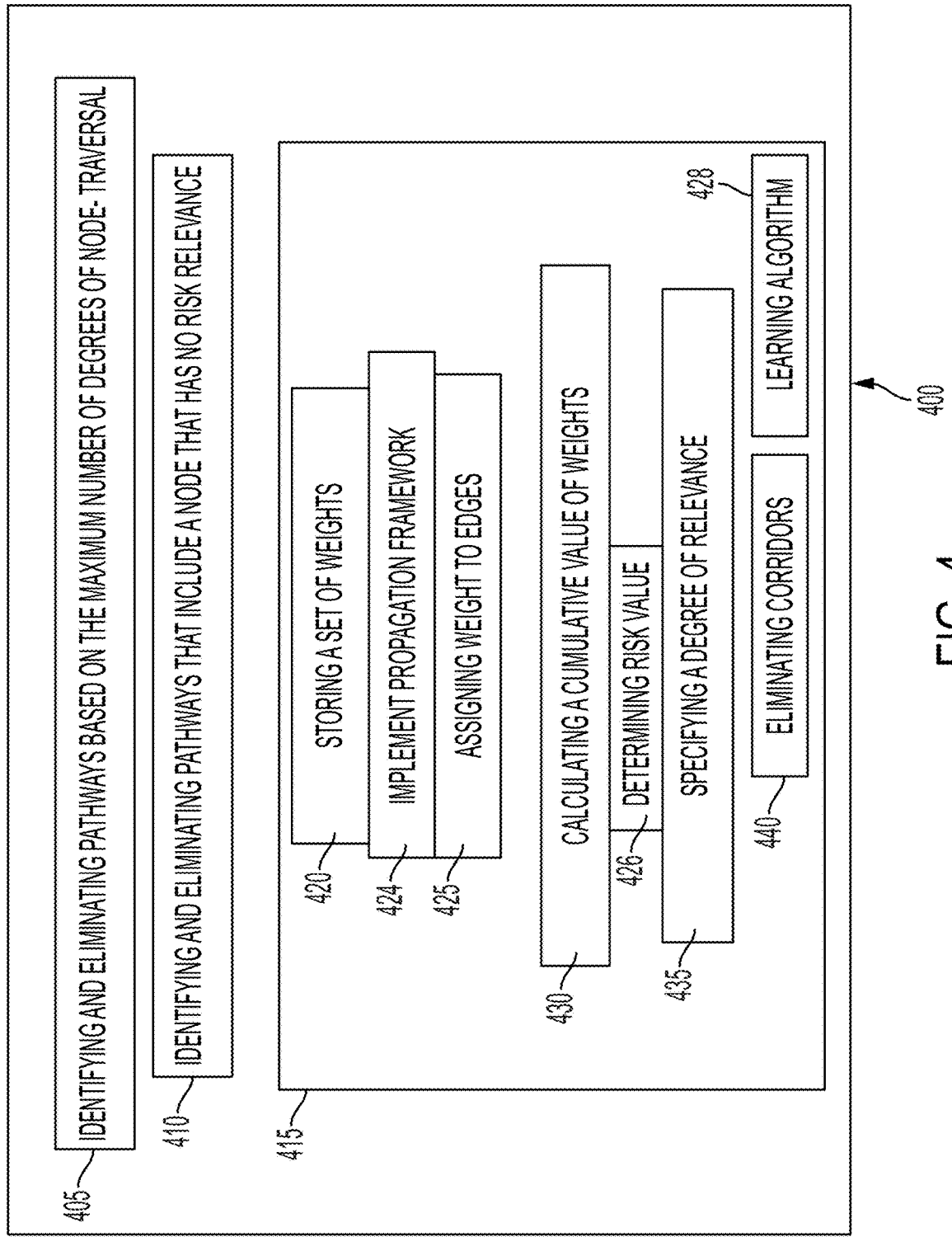
FIG. 4 depicts an illustrative process for finding corridors in accordance with some embodiments of the present invention.

FIG. 4 depicts an illustrative process 400 for finding corridors (and for implementing the cognition feature). In addition to the programmed maximum number, the software engine 145 can be configured to apply a process that identifies and eliminates pathways that include a node in the path (between a graph node and a corridor endpoint node) that has been designated as having no risk relevance or low risk relevance for the purpose of corridor generation when traversing through that node to a corridor endpoint node. The determination by the system of which nodes (or edges) are ones that have no risk relevance or low risk relevance for the purpose of corridor generation can be performed in one or more ways (or combinations thereof) that are described herein as illustrative examples. A node (or edge) can be designated as having no risk relevance or low risk relevance automatically or manually. The software engine 145 can determine whether a node is one that has no risk relevance or low risk relevance, without user involvement in the decision. The software engine 145 can make the determination by analyzing the edge connecting the two nodes, the properties of the edge and two nodes, the number of edges the node has, or a combination thereof, and determining that the inclusion of the node, or the path associated with the node, would indicate a neutral or primarily neutral relationship between the two nodes. If desired, a software module that incorporates artificial intelligence, machine learning, or a set of rules can be implemented in some embodiments that determines whether a node or edge has no or low risk relevance for the purpose of corridor generation. Low risk relevance is mentioned to explain that a low level of relevance would still not be sufficient to reach a threshold value for the purpose of corridor generation. The software engine 145 can be configured to recognize nodes that have no risk relevance or low risk relevance (e.g., government node).

This configuration improves the technical and informational aspects of the resulting corridors. For example, in a sanctions application, a node for a government entity can be removed by this rule because its inclusion provides very limited or no relevance for the purpose of evaluating financial crime and sanctions-related risks for two distinct nodes that connect through the government node. In operation, in one embodiment, the system implements a process in which as part of the automated node traversal process, it determines whether each node is identified as a type of node that the system has stored with a designation that this type of node has no risk relevance or low risk relevance for the purpose of corridor generation. If the system identifies a match, the system would eliminate that pathway from consideration and would discontinue traversing that pathway. The node and related connection would be available and displayed (if desired) in a workspace to provide additional information to a user.

Figure 5:
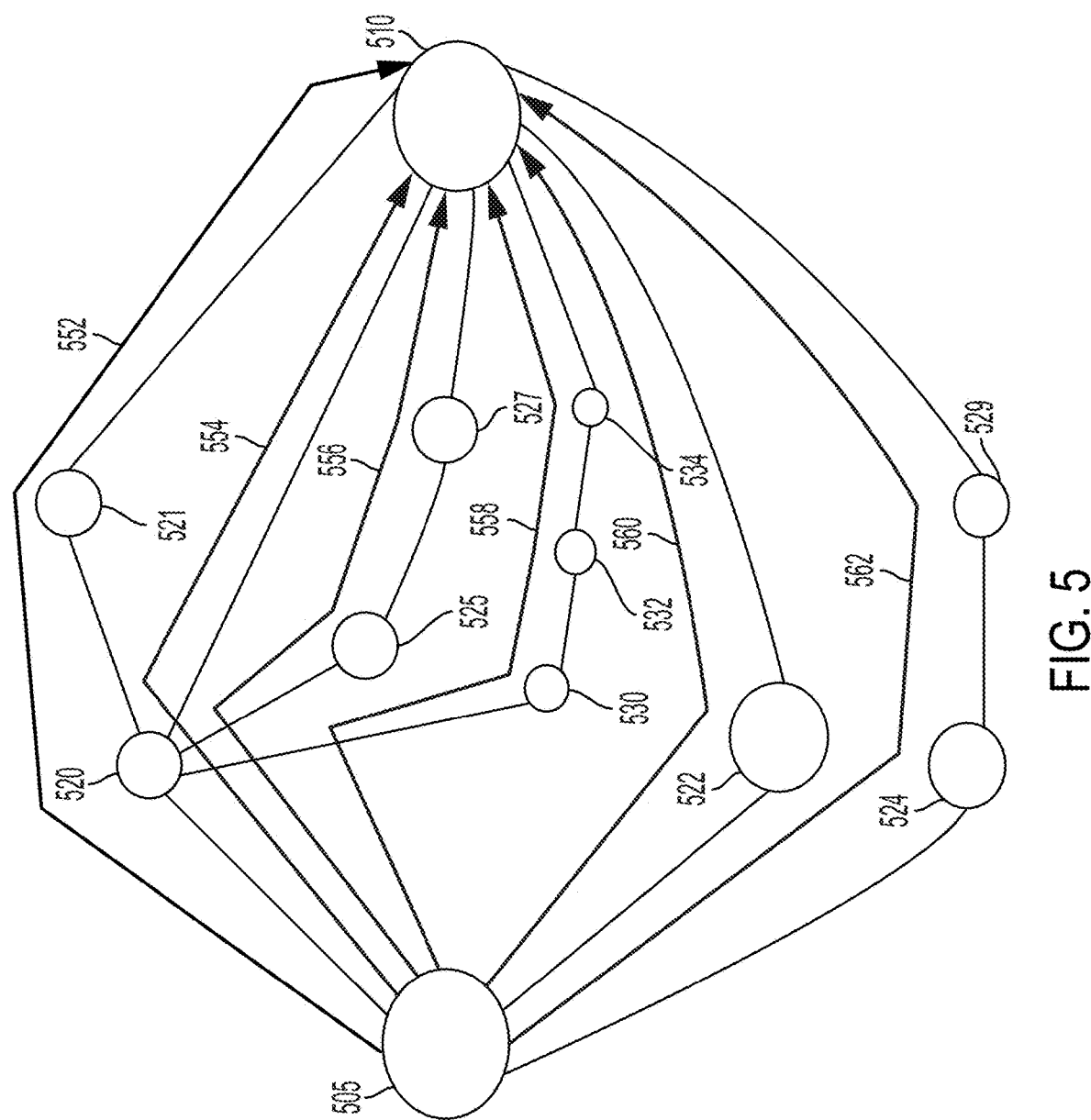
FIG. 5 depicts illustrative steps that determine whether pathways have satisfied certain automated rules to be qualified as corridors in accordance with some embodiments of the present invention.

FIG. 5 depicts illustrative steps 405 and 410 of FIG. 4. In this example, a low maximum number (e.g., 3) is used for explanatory purposes. FIG. 5 shows a graphical illustration of the process in order to further elaborate about its operation. If desired, the graphical illustration could be incorporated into an interactive graphical interface. In FIG. 5, node 505 may have been recently added to the system 100. At this point, for example, the system processes the addition as part of the already existing nodes and edges in the production environment. The system will automatically start at node 505 and traverse connections (e.g., one by one, at the same time, or some variation thereof) and applies automated rules to select corridors. In this case, node 505 has connections to node 510 (a node on a sanctions list and thus a corridor endpoint node) through nodes 520, 521, 525, 527, 530, 532, 534, 522, 524, and 529. The software engine 135 would traverse connected edges and nodes until reaches node 510 or the node traversal is terminated before it reaches node 510 when the software engine 135 determines that the current path it is traversing has reached a maximum number of nodes before reaching a corridor endpoint node or a node or edge (reached in the traversal process) that is in the category of nodes or edges that have no risk relevance or low risk relevance for the purpose of corridor generation. In the illustration, for convenience, lines 552, 554, 556, 558, 560, and 562 are provided as a way to mark and discuss an associated set of nodes and edges that (based on information stored in the environment) establish a path from node 505 to node 510. Those lines are markers for discussion purposes. For example, in this case, using step 405 of FIG. 4, the software engine 135 identifies pathways, referenced using associated markers, 552, 554, 556, 558, 560, 562 that connect node 505 to corridor endpoint node 510 and eliminates pathway 558 because pathway 558 involves more than 3 connecting nodes (e.g., 520, 530, 532, and 534). In operation, the process would stop the traversal process when it reaches the maximum number of traversal nodes (3 in this example) and the system would not identify or "know" that there is a pathway 558 to node 510 because it would have stopped the traversal process when it reached the maximum (i.e., node 532). By performing step 410 of FIG. 4, the software engine 135 identifies that node 522 has no risk relevance or low risk relevance for the purpose of corridor generation, when it reaches that node in the node traversal process and eliminates pathway 560 associated with node 522. Similarly, in operation, the process would stop the traversal process when it reaches the node 522 (determines node has no risk relevance or low risk relevance for the purpose of corridor generation) and at that point the system would not identify or "know" that there is a pathway 560 to node 510 because it would have stopped the traversal process when it reached node 522. As a result, the software engine 135 keeps only pathways 552, 554, 556 and 562 after performing steps 405 and 410 and the kept pathways are determined to be corridors associated with node 505 in relation to node 510 (since there can be other relations). Corridors are automatically added to be available as a tool in the customer interface when or in response to being found by the software engine 135. Other implementations are also contemplated. The "eliminated" nodes or edges would continue to exist in the graph database and can be visually added or included in the user workspace when a user is interactively investigating data using system 100.

The predetermined node type for non-traversal, the type of node that the process should identify and use to eliminate the path being traversed (no risk relevance or low risk relevance), and the predetermined number of connecting nodes (maximum number of node traversal or degrees of traversal) may be inputted by a user into the software interface or can be pre-programed in the software engine 135 (in the implementation of the overall system). For example, a customer that is using the system 100 to conduct an investigation can be provided an interactive option to select a setting such as the maximum number of node traversal or to exclude/include nodes of low or no relevance in generating or presenting corridors.

The process 400 (FIG. 4) further comprises determining a degree of relevance for the corridors 415. The step 415 comprises storing a set of weights in correspondence with the different types of edges 420, assigning weights based on the type of edges in each corridor 425, calculating a cumulative value of weights for each found corridor based on the assigned weights 430, and specifying a degree of relevance to other corridors for each corridor 435 based on the cumulative value. The types of edges may be based on the relationship such as whether the relationship is a shareholder one, an employment one, a banking one, a familial one, or other one and/or the rank in the relationship (majority shareholder vs. minority shareholder, director vs. associate, son vs. cousin, etc.). Each relationship type and rank can have an assigned weight, and certain relationship types and ranks can be configured to have a weight higher than other relationship types and ranks. Higher weight may refer to a higher assigned number or a higher multiplier in the calculation step 430 or the formula used in the calculation step 430. An equal weight arrangement can be implemented such that each edge or type of edge is assigned the same weight whereby emphasis is placed on traversal distance rather than weighting the particular type of edge or node connection for example. The calculation step 430 may be based on adding all the assigned weights of the connecting edges in a corridor. The total sum or cumulative value may be used as the only parameter in the specifying step 435 to determine the degree of relevance. The cumulative value may also be used with other parameters or in another procedure to determine the relevance in step 435. A higher cumulative value may represent that the corridor has a higher relevance compared to other corridors. In some embodiments, a lower cumulative value may represent that the corridor has a higher relevance compared to other corridors. If desired, the degree of relevance may be output as a number on a scale configured to convey such degree. For example, the corridor with the strongest degree of relevance may be marked with "1", the corridor with the second strongest degree of relevance may be marked with "2," and so forth. Other numbers, letter, characters, or orders (e.g., from large number to small number) may also be used. The number may be different from the cumulative value. In some embodiments, the system can be configured to only assign weights that are equal or greater than 1 (with 1 indicating most relevant and ascending numbers, totals, indicating lower relevance, in relation to a weight of 1).

If desired as an option, the step 415 may further comprise a step 440 that eliminates corridors based on relevance determined from calculating weights. The step 440 may eliminate corridors based on assigned weights in step 425 and before the calculation step 430. In this case, steps 430 and 435 calculate a cumulative value and specify a degree of relevance for the remaining corridors. The step 440 may eliminate corridors based on the calculated cumulative value in step 430. The step 440 may eliminate corridors that do not have a cumulative value that is above, below, or matches a predetermined cumulative value. In this case, step 435 specifies a degree of relevance for the remaining corridors. The predetermined cumulative value may be system specified and may include the option to be selected or modified by the customer via a software interface of the system 100. Also, to clarify "eliminate" refers to the process of determining corridors that are identified and presented to the customer interacting with the system. The "eliminated" nodes or edges remain the graph database and can be used in the workspace through visual illustration in response to user interaction with nodes displayed in a workspace or search results.

The step 415 may be performed after the step 405 is executed, after the step 410 executed, or after both steps 405 and 410 are executed. In any of these scenarios, the step 415 may operate to determine a degree of relevance for corridors kept by step 405 and/or 410 without the step 440. The step 415 may also operate to further eliminate one or more corridors kept by step 405 and/or 410 and determine a degree of relevance for the remaining corridors. In other words, the step 440 may be optional in some embodiments.

In some embodiments, the step 415 may be configured to perform before steps 405 and/or 410. In that situation, steps 405 and/or 410 may further eliminate corridors kept by the step 415 (whether step 415 performs the eliminating step 440 or not). In some embodiments, the step 415 may be configured as an alternative step to steps 405 and 410. The process 400 may operate based on the step 415 to eliminate corridors without steps 405 and 410. As mentioned above, this elimination is from the determination of which paths the system identifies to be corridors as an electronic investigational and navigational tool for customer interaction in the application.

At step 424, the platform is configured to implement a risk propagation framework, which is software (computer executable instructions), that configures the platform to provide an interactive computer aided risk assessment and investigation tool. The risk propagation framework is configured to include a set of risk propagation rules. These rules are configured to emulate by way of exercising the rules including defined values and related processes how risk emanates from a source of a risk to other entities. The rules define a risk propagation software model that is configured to quantify an emulation of the risk propagation, by way of entity-entity relationships, relationship type, and potentially the type of risk category, as understood by experts (or potentially those in a particular field of specialization).

The framework, in some embodiments, is configured to include user-designated risk categories or risk topics. A name, that may be determined by a user, can be inputted for the risk category and saved on the platform to identify and select the risk category for later use. The user can be a subject matter expert, customer, or another type of user that has been granted rights to develop or modify tools in the platform such as the deployment of the framework. In this arrangement, the platform can be configured to provide a set of predetermined risk categories to customers of the platform to choose from and those risk categories can be defined to match current risk dynamics (e.g., in the world). As generally understood, other configurations are contemplated and described herein.

The risk propagation rules are configured to assign weights to individual edges using the type of edge for a particular edge. For example, the rules can include a table that assigns weights (weight values) that emulate the risk propagation through that type of edge (relationship). The table can include for each edge type, a constant value or a function that corresponds to each edge type. In some embodiments, the risk propagation rules are configured to include different types of risk models such as based on the type of risk (e.g., financial crime, sanctions, etc.). For example, there can be a first group of risk propagation rules designated for a first risk propagation model and a second group of risk propagation rules designated for a second risk propagation model. Each set of rules may be different such as to use different rules or different values by edge type. By way of accumulation, the platform can store a library of available risk propagation models that each has its own set of risk propagation rules. As a matter of clarification, the propagation may be implemented using other attributes that are assigned weights.

The risk propagation rules include a process in which a source(s) of risk is designated as a source, which is otherwise referred to as a source node, in association with a corresponding risk category (and by implication a set of rules). This can be a process to assign seed nodes for the graph. The source nodes are starting points and in function are to represent the main source of risk or original risk generator. The risk propagation framework also configures the selection of target nodes in the graph database. The risk propagation framework is configured to use a set of the risk propagation rules to calculate a risk level, generally referred to as a risk value, of a target node. In some embodiments, the risk propagation framework designates all nodes (other than source nodes) as target nodes. In other embodiments, a user can selectively pick the target nodes by using the visual interface (for example). By definition, for a particular risk category, the platform is configured to traverse one or more paths (all paths spreading) from a source node for that particular risk category to find the available paths to the target node(s) (all or each target node designated for that particular risk category). The risk propagation rules apply a process to the found pathways and calculate a risk value at the target nodes. A risk propagation rule can be configured, as an initial step, to define a risk value for one or more source node (this can be a global value that is set for all source nodes for that risk category or used in all risk propagation). The risk propagation rules are configured to propagate the risk and the risk value, through the paths (by using a weight and calculating the risk value at each node). The risk propagation rules are configured to multiply the risk value by a weight assigned to a connected edge to calculate the risk value at the node connected by that edge. If desired, a function other than multiply can be used. The process of multiplying the risk value with the weight value to calculate the risk value at each node is performed stepwise and in sequential order, as the process traverses connected nodes and edges in a path to reach a target node. This iteration is performed until the traversal reaches a node designated to be a target node and the risk propagation framework assigns the final calculation to be the risk value for that target node. In addition, in the event that a node (being traversed or the target node) is connected to multiple edges that are part of paths that connect back to the source node for that risk category, the risk propagation rules are configured to sum the risk value produced from each edge to determine the risk value at that node for that particular risk category. The risk propagation rules can be configured to set a cap for the total value in the event of a summation that is, for example, limit the value to be no higher than the risk value specified for the source node. The term exposure score is also used herein to refer to the risk value at the target node, which results from the described propagation model and processes described herein.

The risk propagation framework can include, as part of the risk propagation rules, additional rules. The additional rules can be configured to regulate the process (across all risk propagation traversals or customized for specific uses such as for a particular set of the risk propagation rules or risk categories). The system can be configured to modify rules or weighting using data from external datasets that have been aligned with the dataset of the system's graph database.

As explained herein, the nodes, edges, and related data in the graph database are "live" in that new nodes and edges are (continuously) added to the graph or the nodes and edges may be updated or modified as a result of updates to the graph database. The state of the graph (and contained nodes and edges) can continually change. As such, the platform will update the calculations when new nodes or edges are added or existing nodes or edges are updated. This process can be configured to limit the updates to occur in response to situations where paths between processed source nodes and target nodes are affected (e.g., by checking and using it as a trigger). For example, the platform may determine that an existing source node has a new edge connection and this triggers the processing of new paths or potentially a recalculation of risk values.

The additional rules can include a set of rules directed to managing and appropriately assigning risk values to "competing" risk categories in the graph database. The platform is configured to permit each node to be associated with multiple risk categories. The traversal for a first risk category and a traversal for a second (different risk category) can involve traversing through (or to) the same node and each such node will have a risk value assigned to that node for that corresponding risk category. Because of the numerous risks a particular entity might be exposed to, this has been found to create complexities in the emulation of different risk categories that could be analyzed by a subject-matter expert. The Applicants, in this embodiment, selected to configure the risk propagation framework to include a rule that determines whether the traversal of nodes as part of a particular risk category includes crossing a node (traversing through a node) that is a source node in another risk category. This is one example of risk propagation rules implementing an algorithm that determines the risk value at a node as a function of one or more interrelationships between two or more risk categories at that node. When the platform, in operation detects that the current traversal node is a source node in at least one other risk category, the risk propagation rules are configured to apply a multiplication factor to the current traversal node (as a matter of algorithm). The multiplication factor (can provide a discount or reduction in risk value) that adjusts or discounts the risk value for such a node to account for the competing risk category at that node. The graph in having a "live" state will be making the adjustment regularly and as explained, the process is performed sequentially and the update will require further downstream updates in the path to a target node. Other functions for determining the risk adjustment are contemplated.

Other possible rules as part of the risk propagation framework include rules that are configured to enforce a cap to the maximum value for a risk value assigned to a node and rules that are configured to adjust a calculated risk value to be adjusted to be zero, in other words, not assigned to a risk category when the rules determine from an assessment of the risk value and/or other risk values assigned to a node that the risk value is too small to include in the graph. The rules are configured to remove that node from the subgraph. To aid in understanding, a value of zero for the risk value of a node means that the node is determined by the framework to not be associated with that risk category and would not be included in the traversal and calculations.

The risk propagation rules can be configured if desired to enforce a maximum number of traversals. This cap on the number of nodes traversed to reach a target node can be configured to be a number such as five or eight. It can provide a secondary method of refining the subgraph determined to be associated with a risk category, corresponding source nodes, and target nodes. Limiting the number of traversals can impact the risk value at the target nodes because the value involves the summation of risk values if a node is connected to multiple paths that track back to one or more of the source nodes for that assessment.

At step 426, the risk value can be determined using the risk propagation framework including the risk propagation rules (as discussed above and herein).

The weights assigned as part of the risk value determination may be a different set of weights than are determined and stored on the platform relative to the weights discussed herein in connection with the corridor tool. If the platform is configured to include both features, an edge may then have different weight values depending on the included tool. Given that there may be overlap in operation or steps between the corridor related feature and the computer aided risk assessment feature, the platform can be configured to use steps 420 (storing weights), 425 (assigning weights), or other process or steps involved in implementing corridor related features in the cognition related feature(s). For example, step 440 of eliminating corridors is involved in the aided risk assessment process because the risk propagation rules can be configured to terminate the traversal of a path seeking to reach a target node if for example a maximum number of nodes have been determined to have been traversed or if the risk value calculated for a node is subject to a rule that modifies the risk value to be zero or to have no risk association with that particular risk category. Such rules would eliminate some of the paths in the graph database that may otherwise find a route to one or more target nodes.

At step 428, the platform can be configured to implement a learning algorithm and use artificial intelligence or machine learning methods to update, modify, or adjust the risk values or weights assigned as part of the risk propagation rules. At step 428, the software can be implemented as part of the platform that configures a process that performs updates or modifications to the risk weights or values. Software can be configured to tune the risk propagation rules by way of selecting risk values and related weights as features to train a predictive model. For example, the platform can be configured to assign risk values to a plurality of target nodes where the assigned risk value is provided from an external source such as an expert or other system that has determined the risk value or level at that target node, given the paths to that node from the source nodes (and competing risks in the graph), should be assigned a certain risk value. These are the training values. In conjunction, and as discussed above and herein, the platform is configured to operate the risk propagation framework and apply the risk propagation rules and calculate risk values for the same target nodes using the existing saved rules and values on the platform. The platform can perform a process that trains or modifies the weights and/or risk values to produce risk values that match or substantially match the training (e.g., "expert") risk values for those target nodes. The score generated by the training process can be used alongside or in combination with the absolute value found in the risk propagation calculation to produce revised risk values. This can be used to update the weight for a risk propagation model or risk category to be used for future determinations. This can also be used to modify the existing network that was trained to use weight values or risk values as modified by the training for future traversal such as when new nodes or edges are added to the graph database. For example, in some embodiments, the system is configured to determine an exposure score for a target and the exposure score along with the related subgraph are presented to an expert (via a user interface). The expert provides feedback on the exposure score for the target. The expert may provide feedback that communicates that the exposure score should be raised or lowered based on the expert's knowledge of the field and the displayed subgraph. The system can be configured to receive the expert's feedback such as to communicate that the exposure score should be changed. In response to the communicated feedback, the system is configured to automatically adjust the weights assigned to the edges in that particular subgraph such that the exposure score is adjusted to reflect the expert's feedback. For example, the system can automatically adjust a weight (increase or decrease) of an edge to adjust the resulting exposure score to match the feedback. Preferably, the algorithm of propagation is not changed but the actual scores for that subgraph are modified in response to the feedback. In addition, the changes in weights or risk values caused by the feedback can result in the risk values or exposure scores to propagate to the rest of the graph based on connections of that particular subgraph with the rest of graph. This can result in a chain of changes within the graph.

In implementation, the system can be configured to calculate an absolute score and a relative score. The absolute score refers to the cumulative calculated risk value for a risk category at a node. The relative score refers to a normalized cumulative calculated risk value for a category at a node. The system is configured to set the relative score to be set to a constant such as the number one (1) to be the sum of the exposure score for all topics at that node when there are no other categories to which that node is assigned. For instance, if an entity only scores in one of the multiple topics, it will get a relative score of 1 on that topic regardless of the absolute score. Conversely, if an entity is very central in the network it will get high absolute scores in many topics, but restricting their sum to 1 will result in this record having lower relative scores.

All the data available to (e.g., all the predetermined numbers, assigned weights, etc.) and produced by the software engine 145 (e.g., the generated corridors, the cumulative values, kept/resulting corridors, etc.) may be stored in the graph database.

The production environment 120 (FIG. 1) is configured to receive and store the resulting corridors and the associated nodes, edges, and properties and risk generated subgraph and risk values in the graph database. The graph database can aggregate resulting corridors and associated nodes (e.g., adding current resulting corridors and associated nodes, edges and properties to resulting corridors and associated nodes, edges, and properties previously stored in the graph database) and maintain edge connections between nodes in different corridors. The production environment 120 (FIG. 1) is configured to receive and store the risk values and subgraphs generated using the risk propagation rules and the associated nodes, edges, weights, and properties and risk-generated subgraphs and risk values in the graph database. The graph database can aggregate resulting subgraphs and risk values (e.g., adding current resulting risk values to previous results for other nodes) and maintain edge connections between nodes in different subgraphs.

Figure 8:
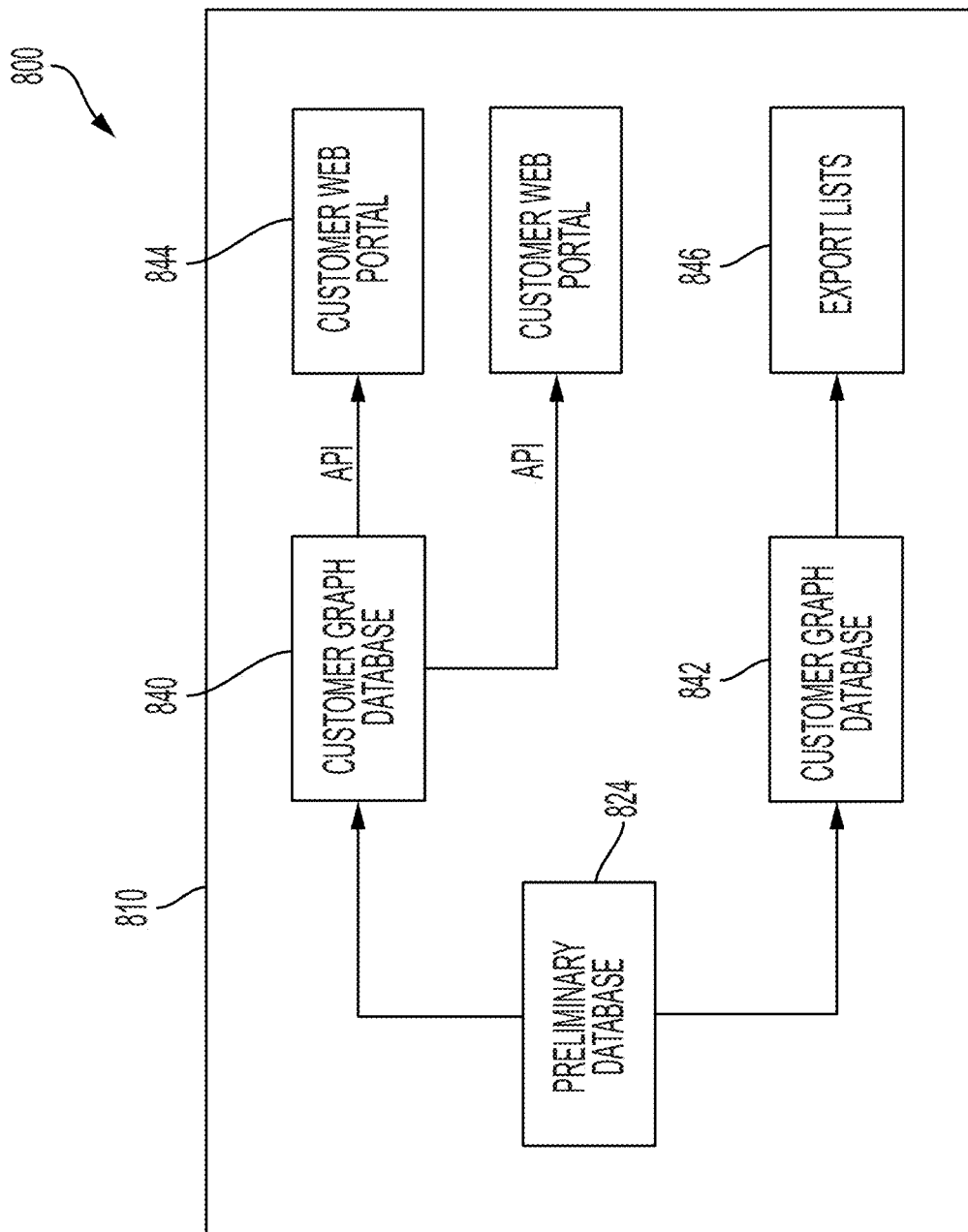
FIG. 8 depicts another illustrative computer-implemented system 800 for providing a visual interactive software tool that permits user to investigate and evaluate financial, trade, and other business-related risks in accordance with some embodiments of the present invention.

The production environment 120 includes an electronic online customer platform 140 (and is accessible via a web portal 844 as shown in FIG. 8) and a software engine 145. The customer platform 140 provides a visual interactive interface that allows a customer to enter a keyword search, search for nodes with properties that match the keyword search in the graph database, add a node that matches the keyword search to an electronic (visual) workspace, view information accompanying a node in a side panel, and add additional nodes and/or a corridor to the workspace. The customer platform 140 can perform its functions using the software engine 145. As the customer enters a keyword search through the interface, the software engine 145 searches indexed properties on nodes in the graph database and identifies nodes that match or are similar to the search query. When the customer selects and adds an identified node to the workspace, the software engine 145 adds the identified node to the workspace by generating and displaying a visual graphical element as representation of the identified node in the workspace. The software engine 145 or more broadly the platform can retrieve the accompanying information (which includes properties) of the identified node from the graph database and displays that information through the visual interactive interface. The displayed or accompanying information may include the relevant information about the node, other nodes directly connected to the identified node, the risk subgraph in which the node is a target node, and a number of corridors. Upon the customer selecting and adding one of these such as the risk subgraph or corridor, the customer platform 140 generates and displays a visual graphic as representation of the corridor or risk subgraph in the workspace. The visual graphic for the risk subgraph or corridor is generated and displayed by the nodes and edges that form the risk subgraph or corridor, correspondingly. Customers can access the production environment 120 over network connections such as over an Internet connection.

Figure 6:
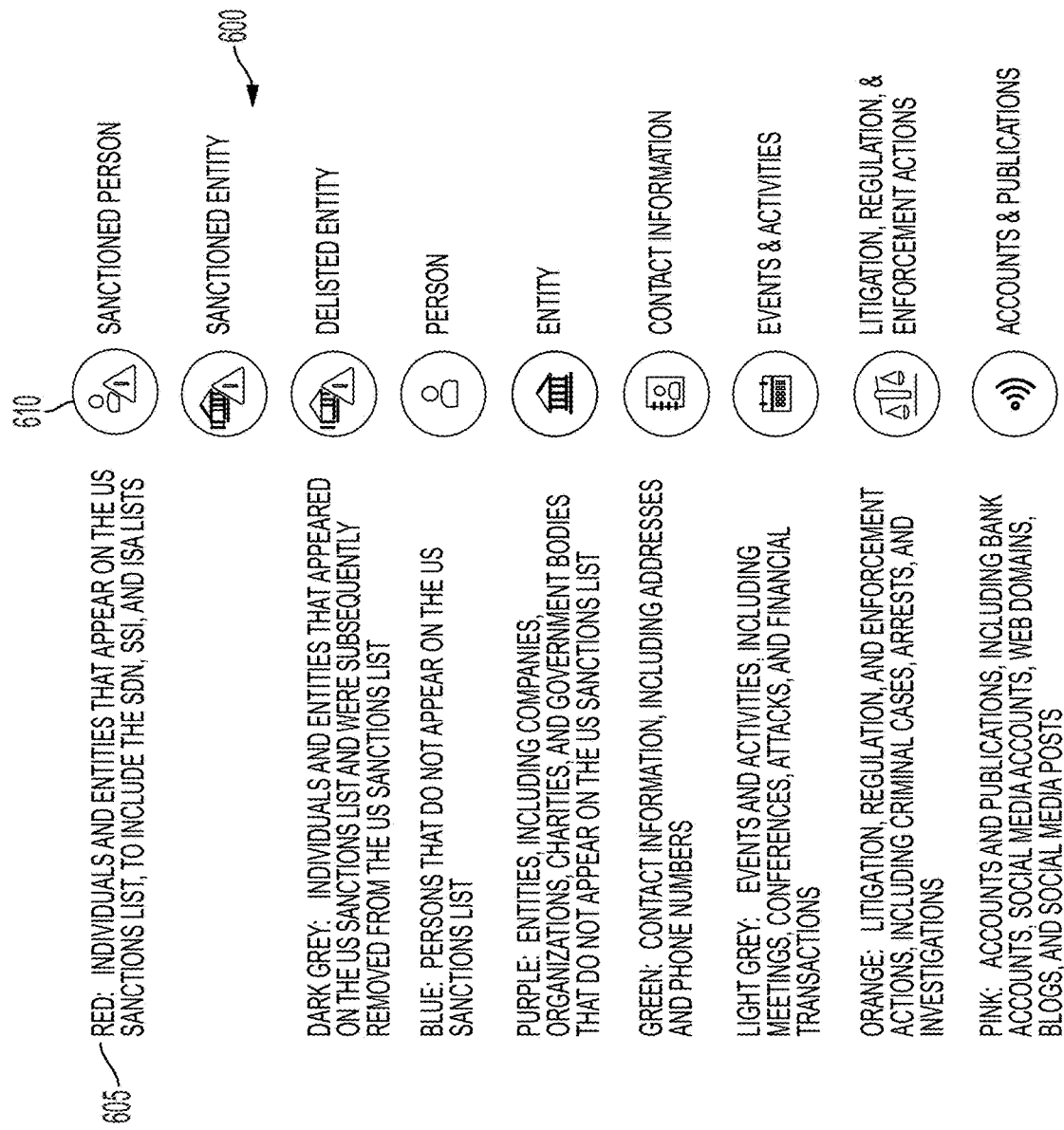
FIG. 6 depicts illustrative visual graphical elements with color indicating a particular type of node and symbol indicating a particular type of subject in accordance with some embodiments of the present invention.

The platform 140 is configured to generate and display a plurality of visual graphical elements. The platform 140 may generate a circle as the visual graphical element for a node (see FIGS. 2, 3, and 5). The circle may have a different size or color to indicate whether the node is identified as a particular type of node, including, for example, a corridor endpoint node. The circle may be further produced with a symbol indicating a particular type of subject. FIG. 6 depicts illustrative visual graphical elements 600 of a node with color 605 indicating a particular type of node and symbol 610 indicating a particular type of subject. As shown, visual graphical elements can be displayed in or on the nodes such as the shown risk indicators. The platform 140 may generate a line as the visual graphical element for an edge (see FIGS. 2, 3, and 5). The line may have a different thickness, length, or color to indicate the type of relationship. The line may also have an arrow at either end to indicate the direction of the relationship. Preferably, in the described implementations the edges have a single directions (point in one direction). A separate traversal line (e.g., arrow lines in FIGS. 3 and 5) can also be provided to illustrate the path of the corridor. Visual graphic refers to a visual representation created by one or more visual graphical elements. The platform 140 may also generate other shapes to represent node, edge, and corridor.

Figure 7:
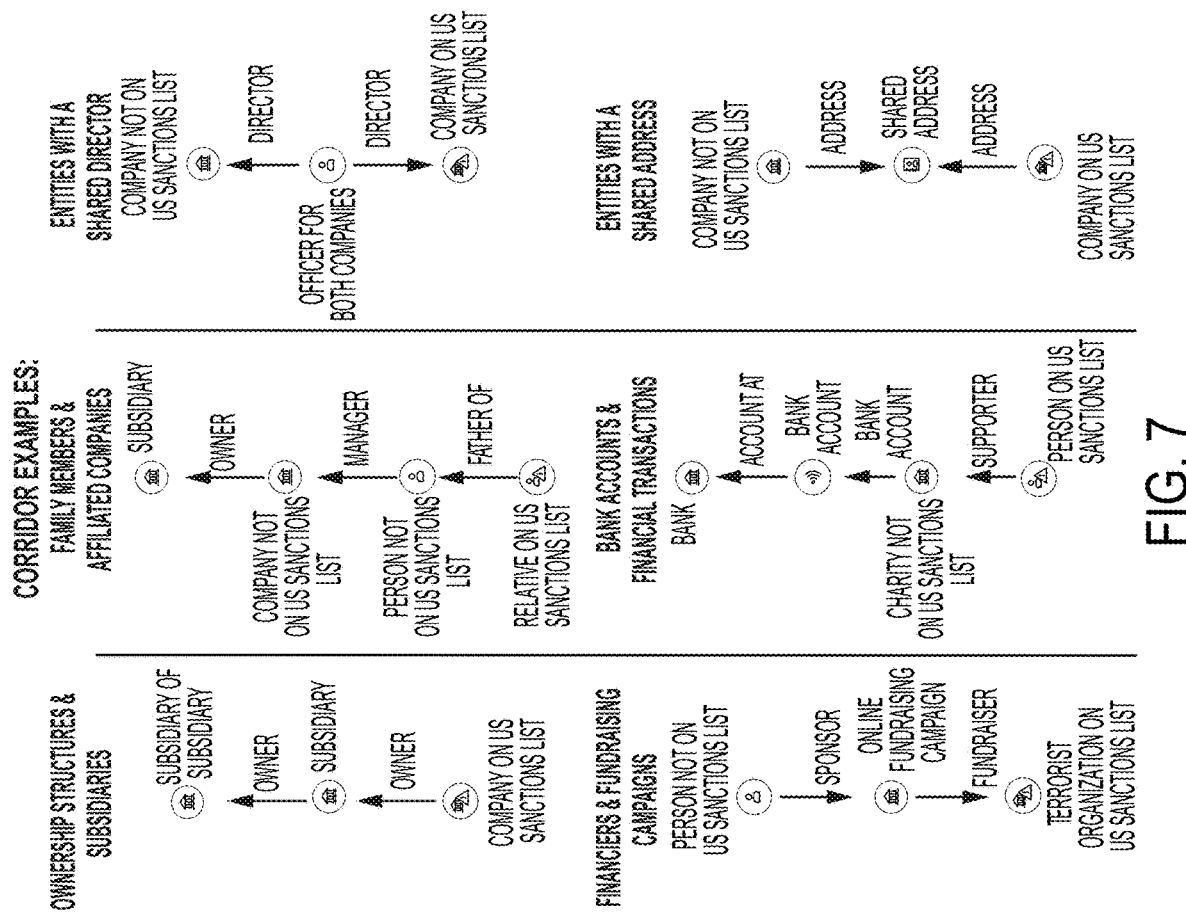
FIG. 7 depicts additional illustrative paths that have certain types of relationships in accordance with some embodiments of the present invention.

FIG. 7 depicts additional illustrative corridors that have certain types of relationships. The types of relationships may include ownership structures & subsidiaries, family member & affiliated companies, entities with a shared director, financiers & fundraising campaigns, bank accounts & financial transactions, entities with a shared address, and other types of relationships.

FIG. 8 depicts another illustrative computer-implemented system 800 for providing a visual interactive software tool that permits user to investigate financial, trade and other business risks, which as described in this illustrative application is directed to investigating and evaluating financial crime and sanctions-related risks. The system 800 comprises a production environment 810. The system 800 includes preliminary database 824. The preliminary database 824 is configured to feed or add information to the graph databases 840, 842 (customer graph database). The preliminary database 824 can be a graph database or combination of different databases. The preliminary database 824 is configured to provide if desired a software way point through which new data is added and ingested by graph database 840, 842. For example, system 800 may have a daily or continuous process in which new data is received by system 800 and held in database 824 and then added to databases 840, 842. Processes such as transformation or conversion to the system's data structures can be applied in connection with receiving or holding the data in graph database 824. System 800 can be configured to receive data (e.g., in batches or streams) from many different data sources (e.g., external such as government databases, or internal such as information generated by system 800). Communications such as Internet communications or local network communications and different types of data transfer protocols can be used to effectuate the functionality. The graph database 824 may be configured to automatically add graph data to databases 840 and 842. In some embodiments, the database are integrated or provided in the same database using logical divisions or controls to provide the described functionality. The graph databases may include one database 840 dedicated to customer web portal 844 and one database 842 dedicated to tailored data sets or bulk exporting of tailored subsets of data. Customer may log into the production environment 810, or the platform for customers 140 shown in FIG. 1, via the portal 844. The communication between customer and the platform 140 and between the customer web portal 844 and the graph database 824 may be based on an application programming interface (API) to determine whether a customer is an authorized user and to ensure that the communications are secure. The customer platform 140 communicates with the graph database 840 to access the information and save the work customer produced from the platform 140. The graph database 842 is configured to allow using or exporting of tailored subsets of data or files containing the information and work produced. The lists may be exported periodically from the database 842 and for distribution to customers. Generated lists allow individuals to view information and analysis produced by the system without the individuals keyword searching through the production environment 810. The lists can be generated using an automated process that incorporates a set of rules such as identities of entities or nodes in the graph database 840, 842 that are more than 50% owned (directly or indirectly) by a sanctioned entity. In application, corridors are configured to provide an efficient navigational tool for customers that automatically starts from nodes and explores and identifies connections (pathways of one or more edges and nodes) to corridor endpoints in accordance with rules (as illustratively described herein) whereas lists as a navigational or investigative tool are configured to apply rules that rely on whether connecting nodes, edges, or properties in a pathway are of a particular type (e.g., owned by type relationship, which can be directional in nature). Being a node of interest or corridor endpoint can be included in the rules for lists. These tools, including other related ones described herein, provide an automated system that assists to remove less valuable data or noise, automatically while also making the "eliminated" data available in the database for inspection and addition to the workspace. Given the massive amount of interrelated data that can exist, the interactive navigational tools herein address a multitude of needs from perspectives such as comprehensiveness, reduced time of use, visual presentation, speed, or clarity.

In some embodiments, databases 840 and 842 may be one single database configured to be accessible by customer web portal 844 and to export lists 846. The production environment 810 can include the software engine 145 in FIG. 1 to perform the related or supporting operations of the platform 140.

As mentioned above, a subgraph is a graph obtained from the information stored in the graph database or from the overall graph constructed using a subset the information stored in the graph database. Subgraphs can be stored in the graph database. The data in a graph or subgraph can be visually represented using nodes, edges, and properties. The subgraph can be quickly accessed by the system in response to a request from users and provide users data surfacing or showing paths that survived a specified traversal process emanating from the node of interest (by way of a data table, graph data, or visual representation). That is, the subgraph represents a portion of the graph database propagated from the node of interest and determined by the traversal criteria. As is evident, in this process, as illustrated, in the corridor feature, the process is configured to start at a node and traverse through pathways to a node of interest, such as a sanctioned node, to generate corridors. In the cognition feature, the process is configured to start from source nodes (selected to be the source of risk, for example) and traverse paths through nodes and edges connecting the source nodes to a specific target node. The paths found from that traversal are the cognitions subgraph (there can be multiple paths from a source node to a target or from multiple source nodes to the target node). In some embodiments, there may be configurable rules for the cognition feature that may limit or prune the subgraph and principally as discussed, this could include a maximum node traversal limit. Edges of different types would be traversed by the cognition feature because the assigned edge type weights can cumulatively contribute to the analysis of risk propagation.

As discussed, the graph database may be enriched with custom data of the cognition feature. Categories, themes, or topics can be classified and added to the graph database which, for example, can include categories such as trade restrictions, nuclear proliferation, military end use, or human rights offenders to enable specific quantitative and qualitative assessment of networks or subgraphs (using the risk categories and related process involving source nodes, target nodes, traversal, and related rules). For instance, a subset of the graph can be classified as related to military end use (by identifying source nodes and associating the category of military end use to those source nodes) to enable the identification of corresponding subgraphs for each target node and risk value determination of the target nodes. The cognition subgraph (and determination) can provide information that may not be otherwise available or be in a manner that can be easily digested by users. The subgraph may be displayed on an interactive user display or may be used to enhance other information displayed on an interactive user display as discussed in more detail below.

As a matter of clarification, ownership refers to an entity or individual's ultimate and exclusive rights, conferred by a lawful claim or title, to property. Share of ownership refers to the proportion of rights an entity or individual has to an entity or other property and can be represented in percentage. Share of ownership can be determined by identifying the number of shares the sanctioned node has in the other node, by identifying a title or other information indicating ownership, or by other methods. The system can be configured to receive data with respect to ownership and use that data property in the graph database for the automated analysis. For example, certain public databases or paid research sites may store entity and ownership information and the system can retrieve that information and apply it in the system in the graph database and related features.

Figure 9:
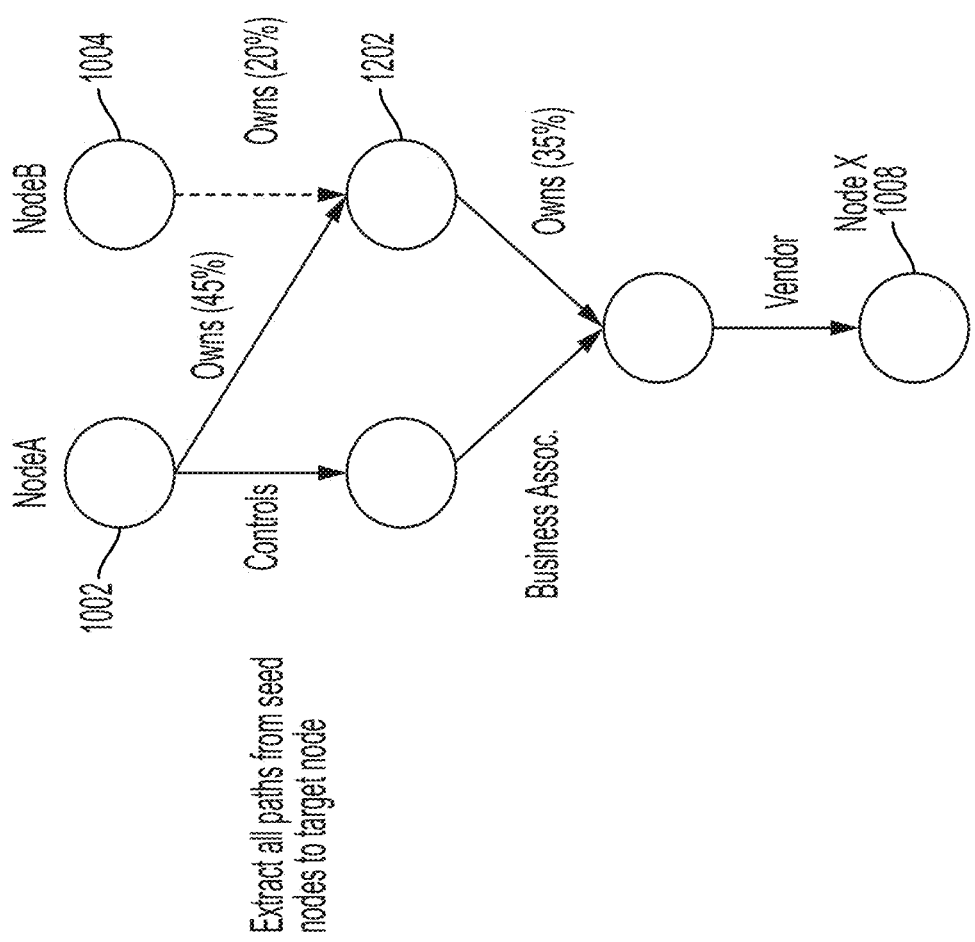
FIGS. 9-15 provide illustrations that demonstrate rules implemented as part of the cognition feature in in accordance with some embodiments of the present invention.

With reference to FIG. 9, node A 1002 and node B 1004 are stored in the graph database and can be selected to be the source nodes assigned to a specific risk category (e.g., human trafficking). Node A 1002 and Node B 1002 can be one of the available node types in the graph database such as company or individual. Node X 1008 is stored in the graph database and can be selected to be a target node. The platform is configured to implement a process (as discussed) such as by the software engine to traverse the graph database starting from each of the source nodes A and B to find paths in the graph database to target node X 1008. It should be understood that the traversal is to find all of the most relevant paths by traversing connected edges and nodes, not all possible paths which could include any circuitous paths that, for example, result in infinite loops. In FIG. 9, a very simple illustration of a node arrangement within a larger graph database is provided for illustration purposes.

As illustrated in FIG. 9, there are various edge and nodes that form a subgraph, which can be all of the paths found by the platform from one of the source nodes 1002 and 1004 to the target node 1008. The nodes in the illustrated subgraph for the purposes of discussion can be one of the node types defined by the graph schema or ontology. Other nodes illustrated are also part of the graph database. The edge types are provided in the figure. The platform is configured to conduct the traversal between the particular seed nodes and each target node (and repeat for other target nodes) to extract that portion of the graph that meets the risk propagation rules. The extracted portion can be saved or otherwise recorded as a subgraph in association with its corresponding risk category on the platform. The platform is configured to apply additional processes to the extracted subgraph to determine a risk value for the target node relative to the risk category under investigation. The nodes in between source nodes and target can be any node in the graph database (e.g., as shown in FIG. 9).

In FIG. 9, the illustrated edge types (defined as part of the data ontology) are control (one entity controls the other), owns (one has ownership rights to the other), business association, and vendor (relationships). As illustrated in the graph database, with respect to ownership edges, the platform can have stored or determined based on collected data an ownership percentage for one or more ownership (owns) edges.

The edge between node 1004 and node 1202 is illustrated with a dashed line because the risk propagation rules are configured in this example to require a threshold with respect to ownership. If the threshold ownership level is not met, that edge is not included (removed or set to zero) in the process. In this example, the ownership percentage of the entity represented by Node B is 20% of entity represented by node 1202 and the risk propagation rules are configured to require a 40% ownership threshold.

Figure 10:
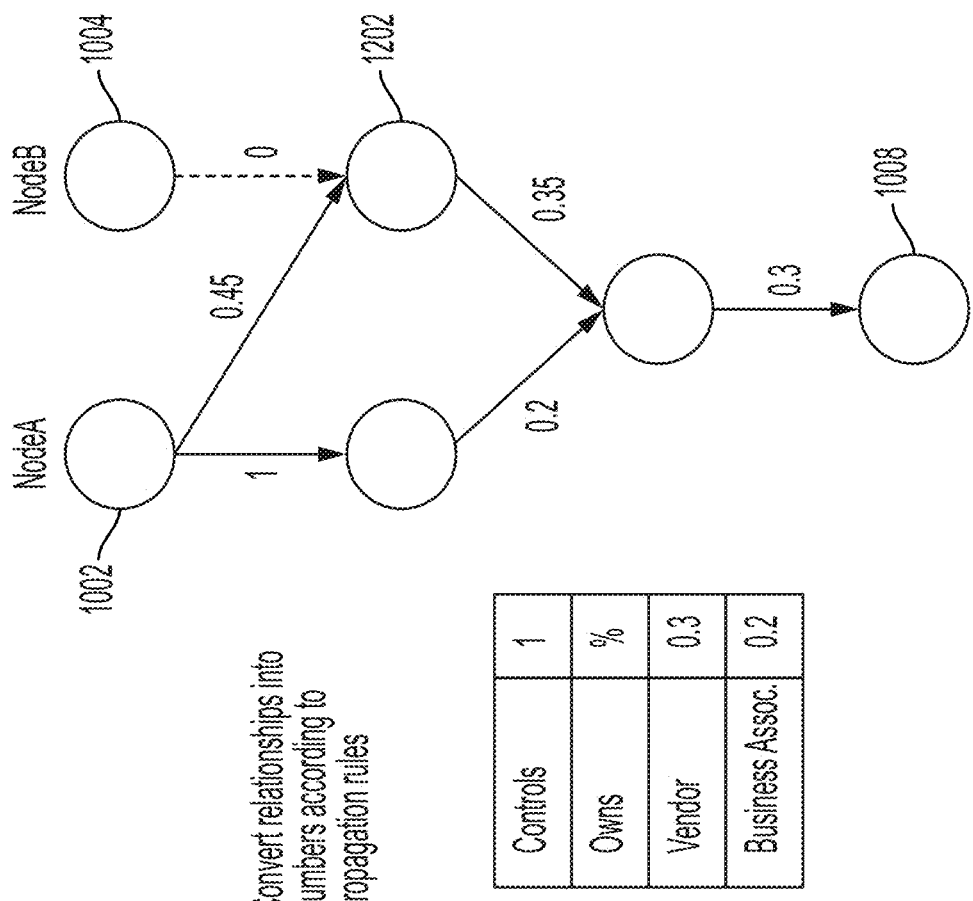

With reference to FIG. 10, the risk propagation rules include a risk propagation configuration for the corresponding risk category such as by assigning a weight to different types of edges (different relationships). As shown, in this model, the platform is configured to assign a weight of 1.0 for the controls edge type (one entity controls the other entity), 0.3 for the vendor edge type (the downstream node is a vendor to the upstream node), and 0.2 for the business association edge type (downstream node, entity, is a business associate of the upstream node, as shown in FIG. 9). Also as illustrated, the weight assigned for the owns edge type is a function of the percentage of ownership as recorded in the graph database. Variations are contemplated. In FIG. 10, the corresponding assigned weights are illustrated next to the edges using the edge type (as shown in FIG. 9).

Figure 11:
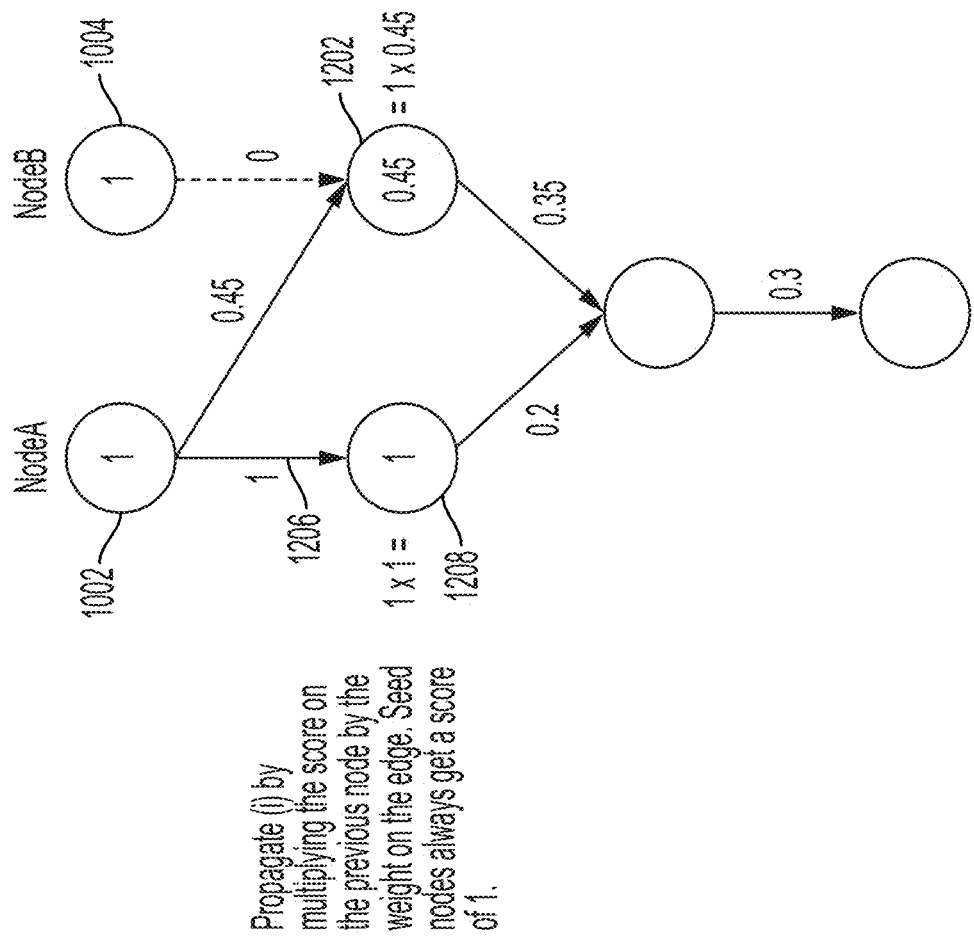

With reference to FIG. 11, the risk propagation rules are configured to perform a process to calculate the risk value using the assigned weights. As illustrated in FIG. 11, source nodes, nodes A and B 1002 and 1004, are assigned a risk value for the purpose of the propagation process. As shown, each is assigned a value of 1.0. The risk propagation rules can be configured by default to set the source node value to be a constant, in particular the value of 1.0 as part of the risk propagation rules. Variations are contemplated. As shown, the graph is directional or hierarchical due to the edges being directional in a single direction (with respect to characterizing the relationships). In other cases, the graph can be bi-directional and non-hierarchical. The risk value of the source node is multiplied by the assigned weight of a connected edge and the resultant value is assigned to be the risk value of the node connected by that edge. As shown, for example, risk value of node 1002 (risk value of 1.0) is multiplied by the assigned weight of 1.0 for edge 1206 that connects node 1002 to node 1208. In this example of the risk propagation rules, the type of node in the path does not affect the propagation process. Variations are contemplated. The figure shows that the risk value at node 1208 (in mid process) for determining the risk value for the target node is 1.0. As shown, the edge between node 1004 and 1202 is assigned a zero weight to eliminate it from the determination because the edge did not meet a threshold ownership percentage. Due to the edge connection between node 1002 and node 1202, the rules multiply the risk value of node 1002 with the assigned edge value of 0.45 (as shown), which results in the node 1202 being associated with a 0.45 risk value.

Figure 12:
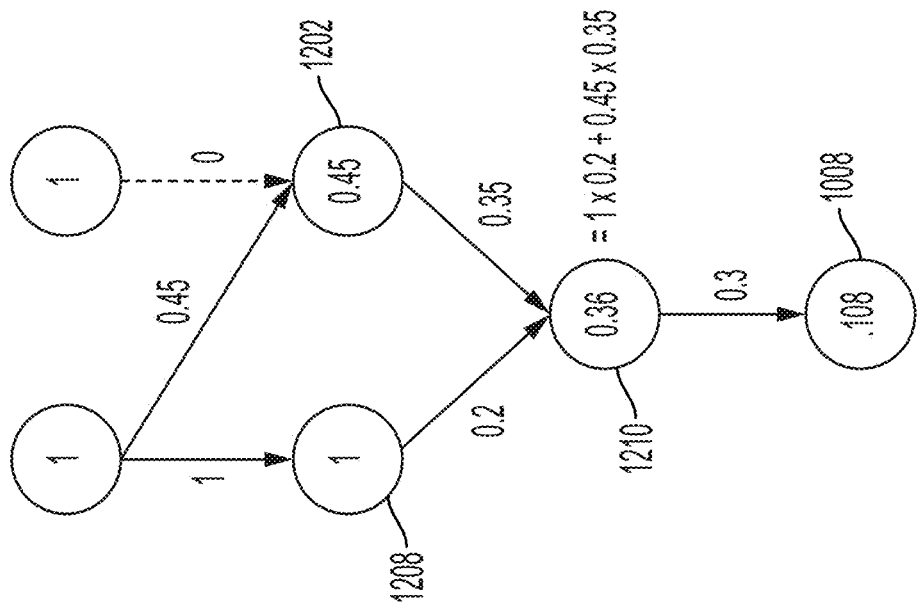

As shown in FIG. 12, the process propagates to the remainder of the extracted subgraph to reach the particular target node. Node 1210 (which may be any kind of node) is next in the traversal of the extracted subgraph. As shown two edges, one from node 1208 and one from node 1202, connect to node 1210 (as the immediate next hop-direct connection). The risk propagation rules iterate the above-described multiplication and sum the resultant values to arrive at the value to use for node 1210. As shown, this process results in a total of 0.36. As shown, node 1210 has only one edge connection in the extracted graph and is the final connection that reaches target node 1008. The same multiplication of the assigned weight with the calculated value for the preceding node is performed to provide an output of 0.108, which can be rounded if desired. The resulting risk value of target node 1008 is 0.108. The value is saved on the platform in association with the subgraph, the risk category, and node identifier for node 1008 for later retrieval and use.

Figure 13:
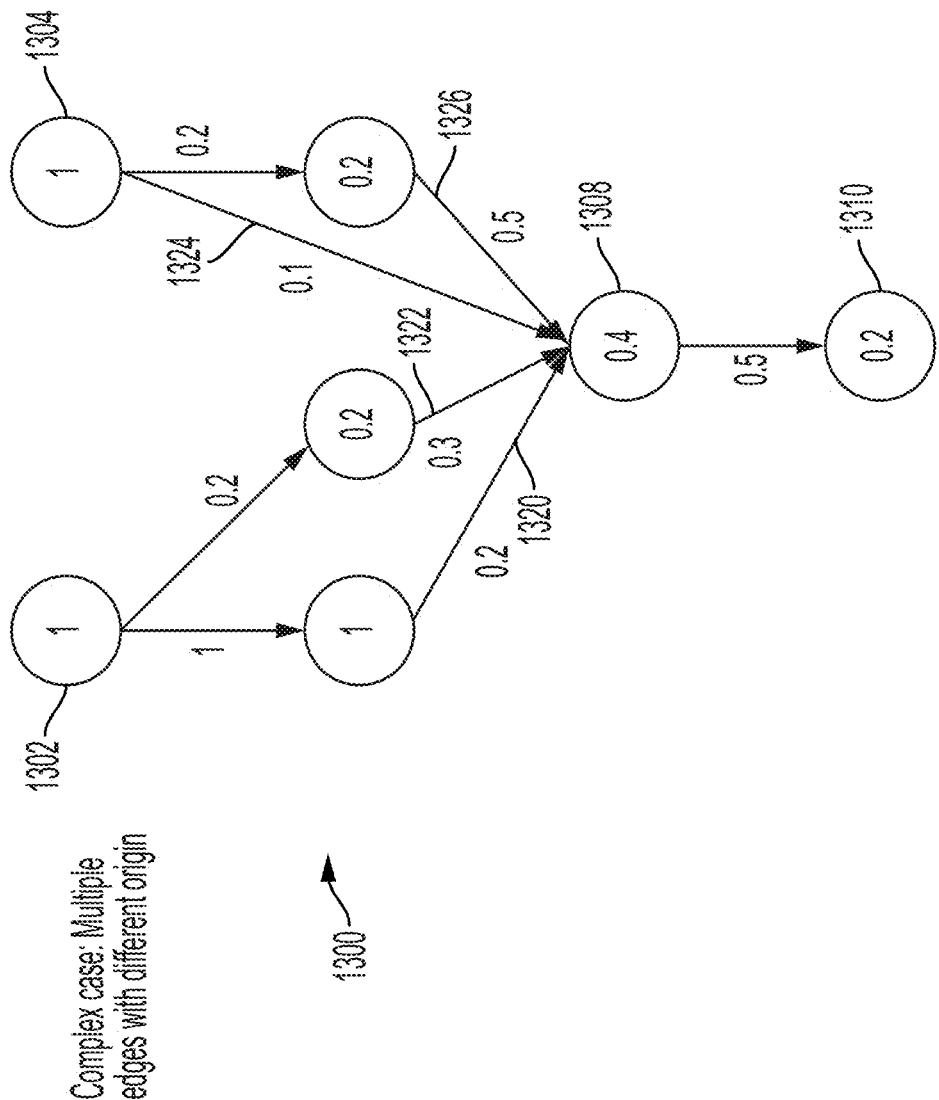

It is possible that a node in the risk subgraph can have many connected edges and it can be desirable to analyze only a subset of these relationships. In some embodiments, the risk propagation rules are configured to use only the top set of edges for the risk value determination when subject node has more than a certain number edges. For example, with reference to FIG. 13, extracted subgraph 1300 includes a connected network of nodes and edges starting from source nodes 1302 and 1304 to target node 1310. Node 1308 is positioned in the next to last hop and has four connecting edges. The determined values and assigned edges are shown in the figure. The risk propagation rules can be configured to only use n edge connections such as three edges connection and select the three edges by determining which three edges generated the highest risk value. In this example, edge 1320 generated 0.2, edge 1322 generates 0.06, edge 1324 generates 0.1, and edge 1326 generates 0.1. The risk propagation rules in this example are configured to use the top three, which means that edge 1322 (0.06) is excluded from being used in the determining the risk value for node 1308 as part of the process. The resulting risk value for target node is 0.4 (0.2+0.1+0.1).

Figure 14:
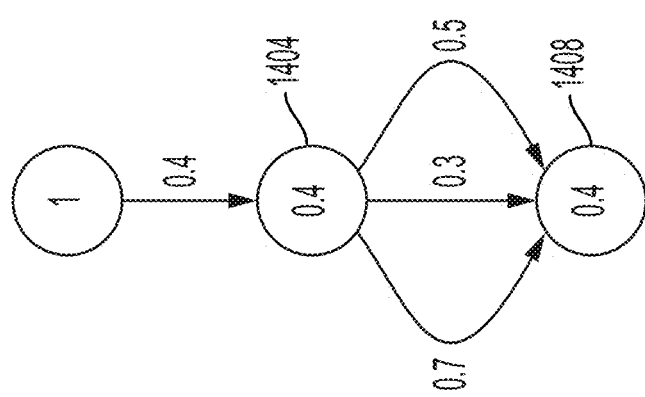

With reference now to FIG. 14, the risk propagation rules are configured to respond to potential problems arising from the situation where multiple edges are from the same parent node. This can be applied in the subgraph when there is such a situation. The rule provides for a more accurate risk propagation emulation. As shown, node 1404 in the extracted risk subgraph has three different edges that connect node 1404 to node 1408. In this example, node 1408 is a target node. The risk propagation rules are configured to detect such an arrangement (similar to the detection mentioned above with respect to many edges connecting to a node) and in response, apply a rule that varies from the process of multiplying and summing the results of the multiplication from each edge connection. The rule is configured to only permit the risk value of the "end" node, node 1408, to be no higher than the value determined if the multiplication/summation process is used. As shown in this case, the node 1408 is assigned to have the same as the number determined for node 1404 (0.4). This is lower than multiplying the edges weights and performing the summation (e.g., 0.4*0.7+0.4*0.3+0.4*0.5). Variations are contemplated. This context detection process (during traversal or analysis of an extracted subgraph) and the use of exceptions or variations in rules from the base rule have been found to provide more useful tools for users in this context.

Figure 15:
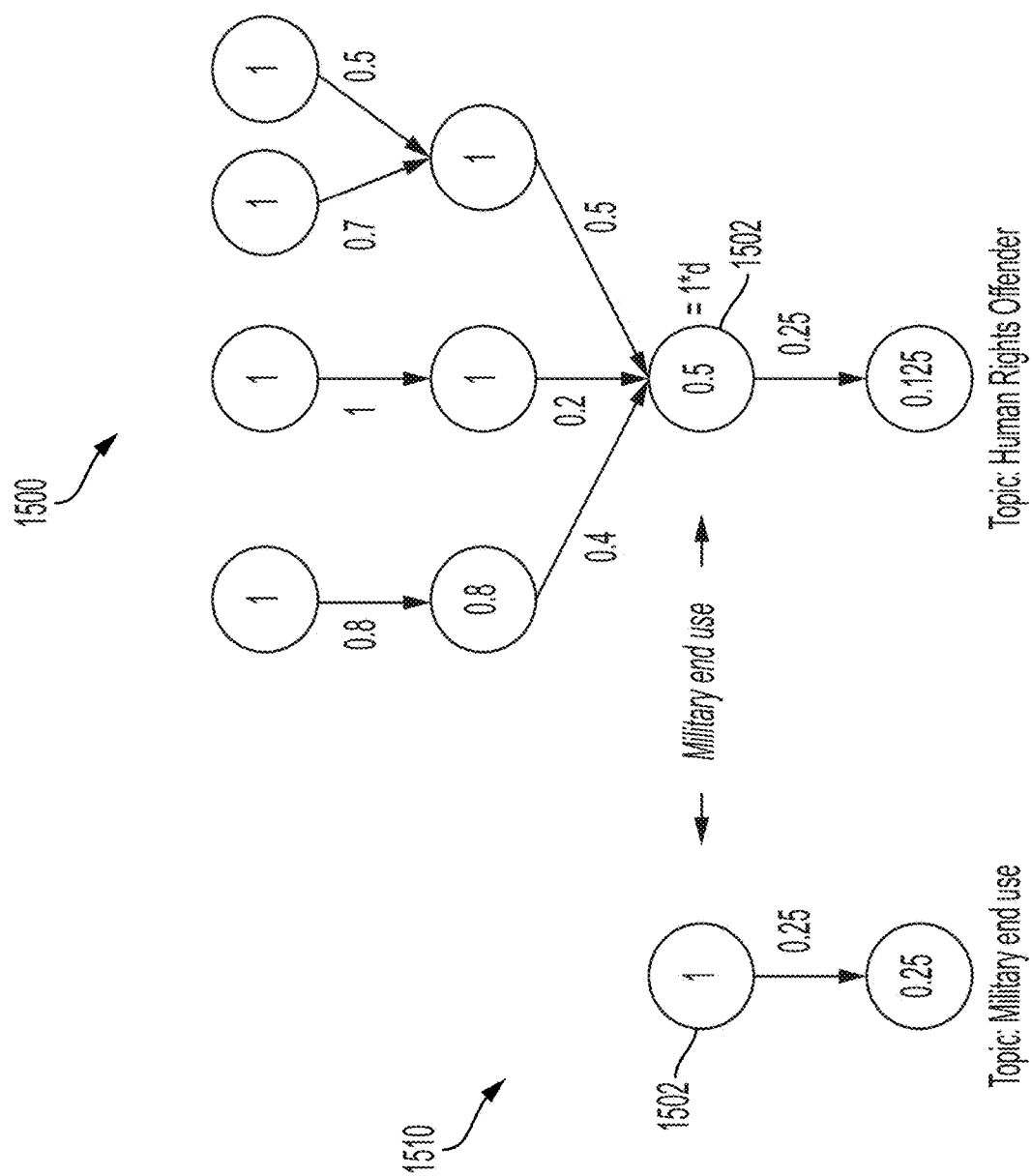

FIG. 15 relates to the competition in the graph database between risk categories. The risk propagation that is understood from the intersection of two risk categories impacts the risk of a target node. The risk propagation rules are configured to implement a rule that performs an adjustment when an intersection or overlap is detected between two risk subgraphs that are each for a different risk category. In this illustrative embodiment, the risk propagation rules determine whether a node in the extracted subgraph that has been produced for a first risk category includes a node that is designated as a source node for a second (different) risk category. The risk propagation rules are configured to detect this situation and are configured to apply a factor (a reduction factor) at the node to adjust the value at the node. For example, as shown, subgraph 1500 illustrates that node 1502 is in the subgraph for a first risk category, which as noted in the example, is human rights offender. Path 1510 is provided to illustrate that node 1502 is the source node for the risk category of military end use. The risk propagation rules apply a discount factor (d) to the value determined from the iterative multiplication (and addition) process when a traversed node is detected to be a source node for a different risk category. In this example, the factor that is used for d is 0.5. FIG. 15 also illustrates a related rule that can be configured by the risk propagation rules. The risk propagation rules can be configured to limit the total value that is determined at intermediate nodes or at the source node to a maximum value that is preferably equal or no higher than the value assigned to source nodes, which in this case is 1.0. In FIG. 15, described process for node 1502 will result in a determined value of (0.8*0.4+1*0.2+1*0.5=1.02) and the rules can be configured to reduce that total when it exceeds the (max) value which, in this example, is the value 1.0 that is specified for the source nodes (as a defined value). As shown, the value at the node is then multiplied by the factor (d), in this example, 0.5, to generate a value of 0.5. The configuration for competing topics creates a dynamic state that changes the risk values as new risk categories are added or removed from the graph database.

Figure 16:
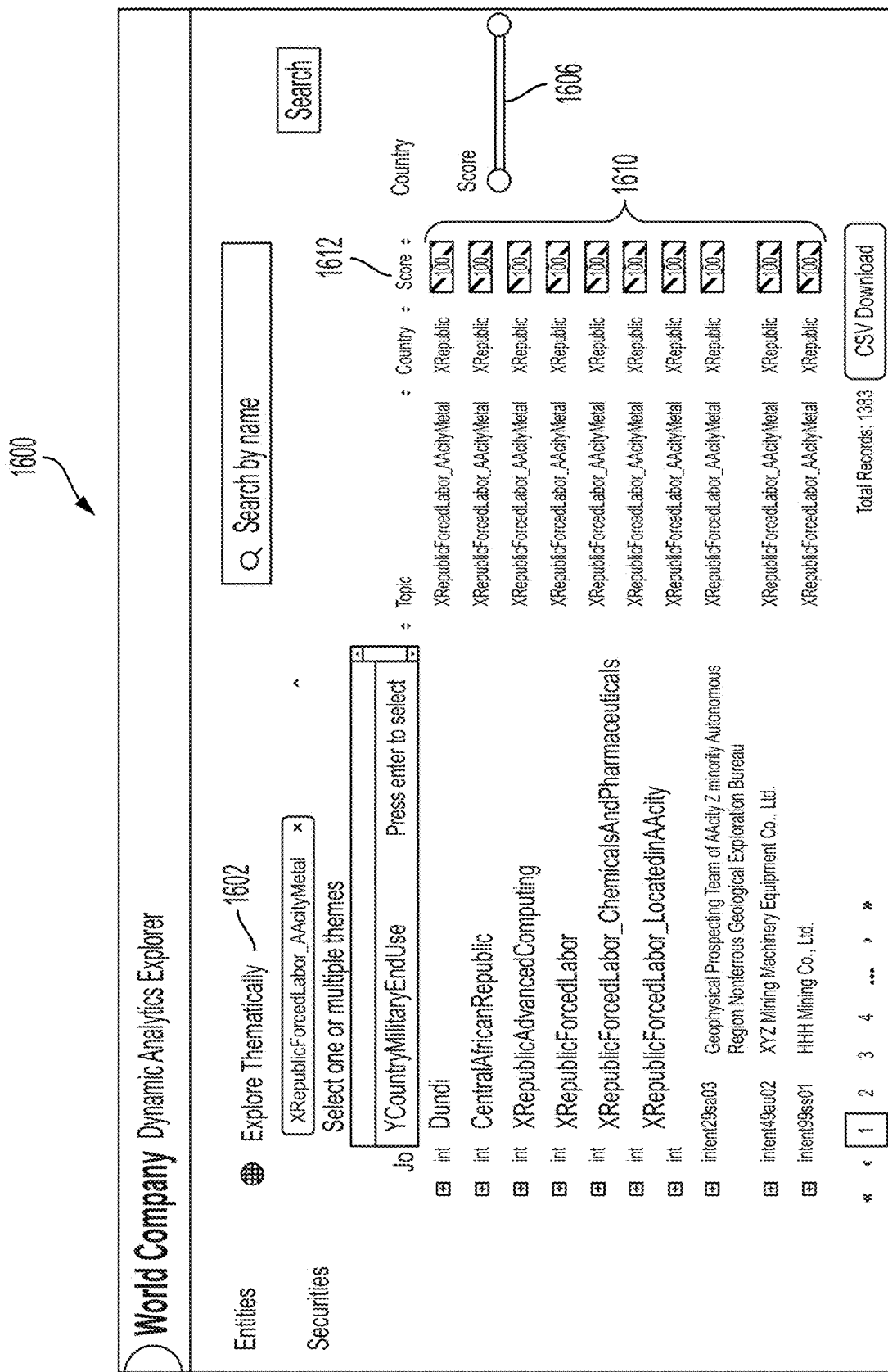
FIGS. 16-19 provide illustrations of visual interfaces that are implemented to provide examples of interactive tools related to the cognition feature in accordance with some embodiments of the present invention.
Figure 17:
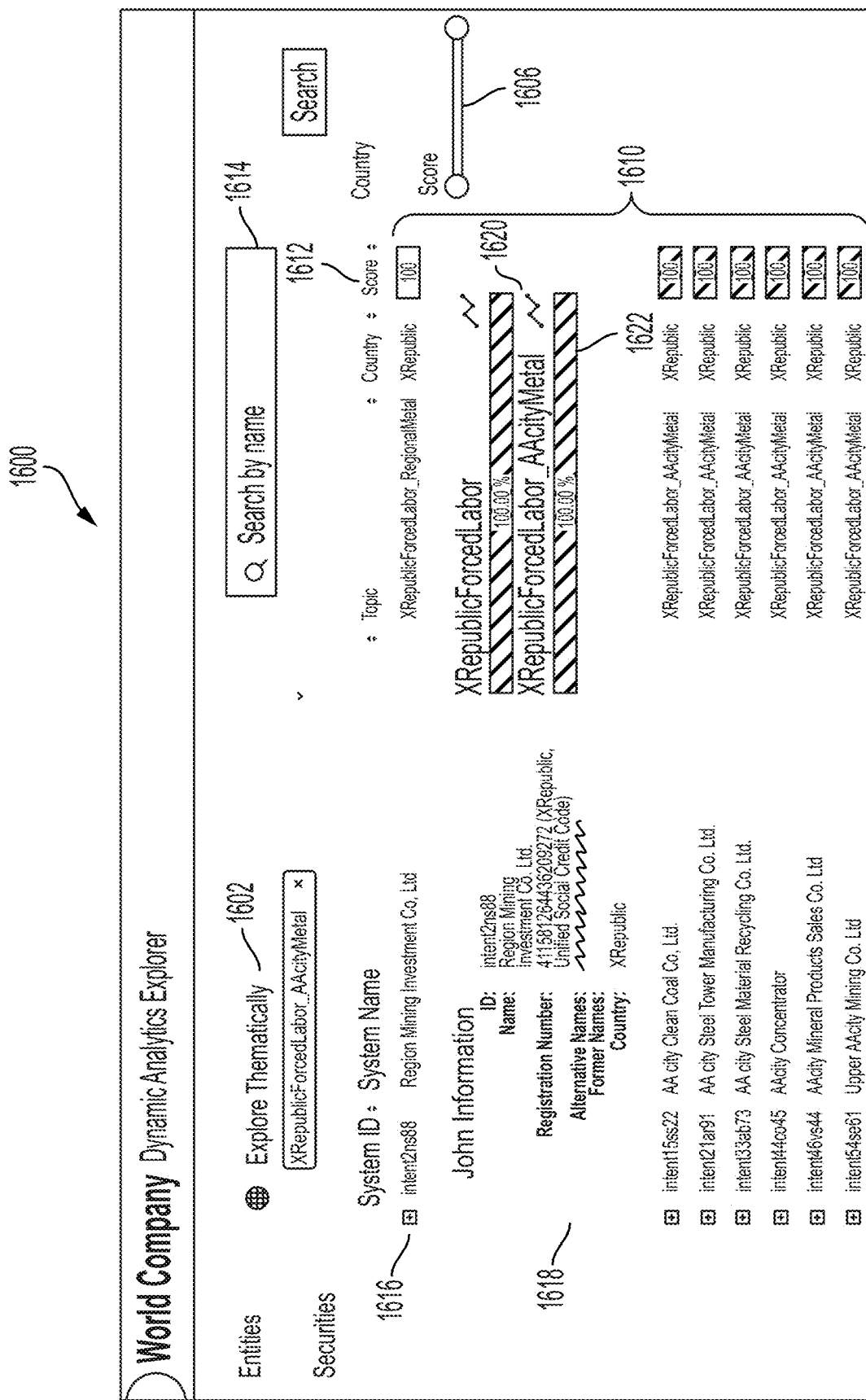

The platform can be configured to provide the customer with a different way of interacting with the cognition feature. For example, an option can be provided that permits the user to select one or more risk topics and in response be presented, via a visual interface, with a list of entities (target nodes) and their corresponding risk value. With reference to FIG. 16, the platform is configured to display through a browser or other interface, interactive display screen 1600. In this example, the platform permits the user to interact with the display screen 1600 to select risk categories or topics such as adding them to topics area 1602, which as includes a pull down menu that lists items to be selected and added to the list of entities being investigated. Screen 1600 also includes an option 1606 to enter a threshold value that is used to filter out nodes that have risk values below that threshold. As shown, option 1606 is configured as a sliding scale that a user interacts with to select the threshold. Display screen area 1610 (in response to the selections) will display a list of nodes/entities that fall under the selected risk categories or topics and the selected threshold level. The list specifies in each row an identification, name, exposure score, and associated topic(s) for each listed entity. As shown, there are over 1,300 matching records in this example. Column 1612 displays the exposure score (the risk value) for the risk category or topic at the node identified by the entity identifier. In the event that a node is listed as being associated with more than one topic, the score that is displayed is the highest score from the risk value determination from each of the associated risk categories. FIG. 17 displays a feature that is available in display screen 1600. Each row in list 1610 can include an expansion option 1616 that when selected displays additional information about the entity in that row to the user. As shown, in this example, the row is expanded and the information is displayed in the expanded row. The information includes details such as registration number, alternative names, and country. Two exposure scores 1620 and 1622 are also displayed in expanded form and the scores correspond to two different risk categories or topics. The display screen uses a bar graphic to illustrate the exposure score value and displays a numerical number for the exposure score. This can provide a quick visual understanding to the user.

Figure 18:
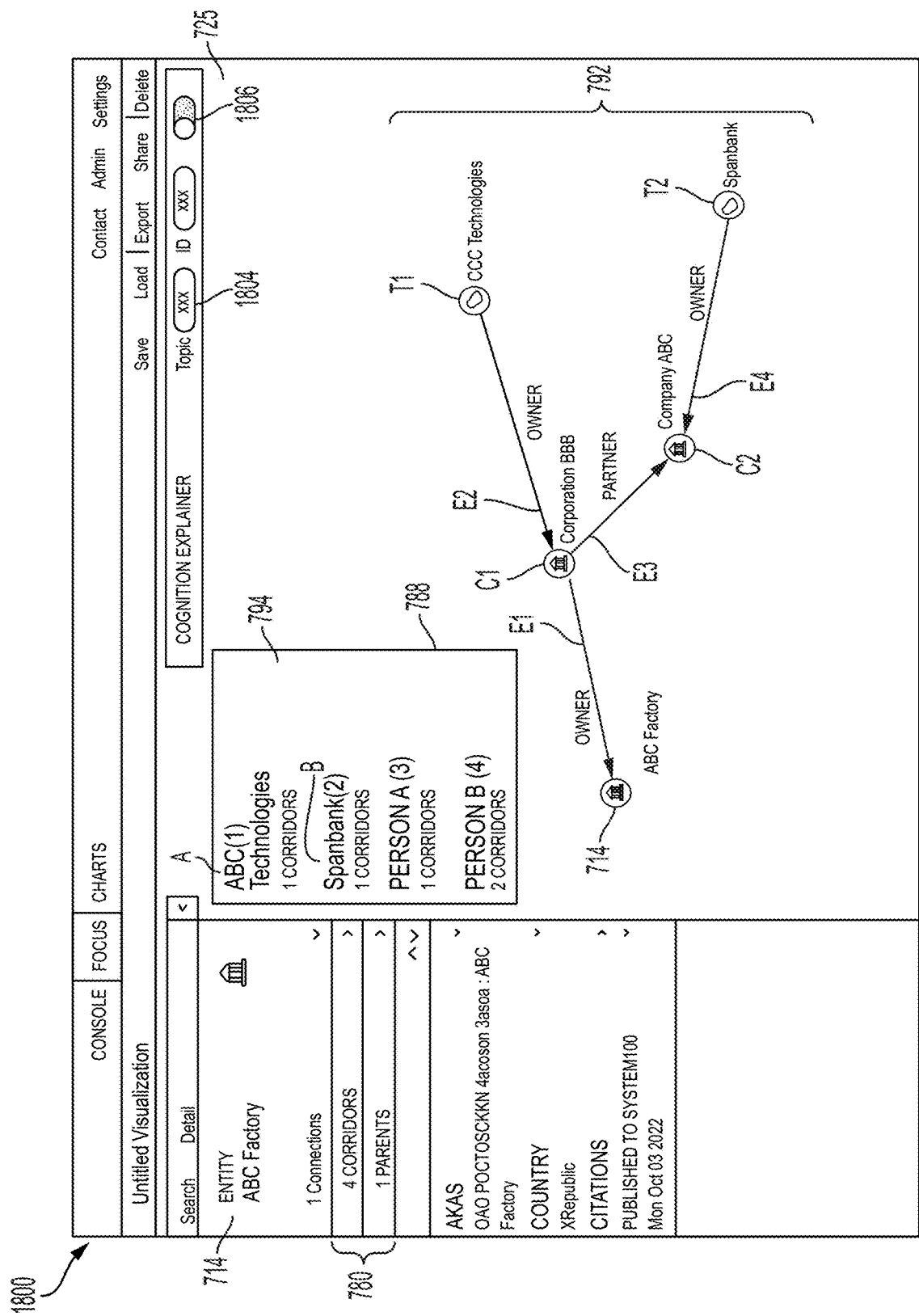

A visual and semantic explainer feature can be provided. For example, a user can select one of the entities on the list and in response, the associated risk subgraph can be retrieved and a graphical representation of the risk subgraph can be displayed by the platform. Variations of the visual and semantic explainer feature are contemplated, for example the visual explainer feature may be accompanied by a semantic narrative automatically generated from the subgraph (displayed on the visual interface and automatically generated from the information on the screen). For example, with reference to FIG. 18, interactive display screen 1800 contains a visual representation of the risk subgraph for the node with identifier ABC Factory and the corresponding risk category would be displayed in text area 1804. Display screen 1800 includes simplification option 1806 that is selected by the user to activate a simplified view of the risk subgraph. The simplification option performs a simplification process that is applied to the risk subgraph that is configured to provide by evaluating the structure of the extracted subgraph and produce a simplified version of the extracted subgraph. The process can detect whether the subgraph includes paths or portions that provide little or no contribution to the risk value for the target node (ABC Factory) such as contributing less than 10%, 5%, 2%, or 1% to the risk value and eliminate those less important paths from the subgraph to display a simplified representation of the subgraph. The process can also be configured to evaluate the structure of the subgraph and determine a priority order of the paths in the subgraph based on the amount by which the paths contribute to the determined risk value for the selected node. The process can select the top n paths to include in the simplified representation to illustrate the more important aspects of the subgraph. In this approach, paths (edges/nodes) are removed from the visual representation rather than, for example, consolidate or combine paths. Variations and combinations are contemplated.

Figure 19:
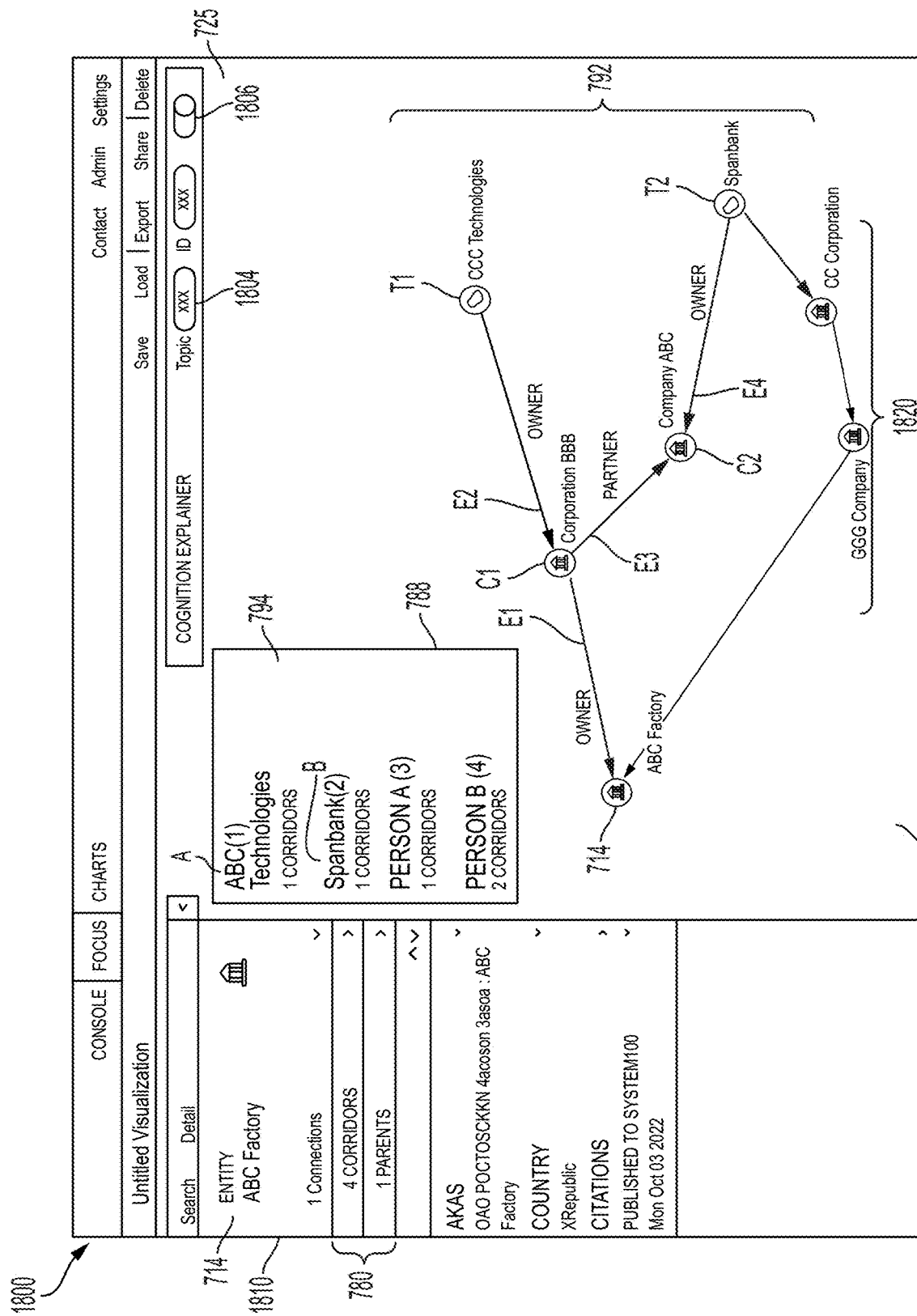

FIG. 19 shows that when the simple option is not selected, the direct and complete representation of the extracted subgraph is displayed. For ease of explanation and clarity, a small subgraph is used for this example but typically the subgraph includes many more nodes, edges, or layers. FIG. 19 shows that path 1820 exists in this presentation which is removed when the simplified view is displayed because based on the evaluation of the structure of the subgraph it is determined that path 1820 ranks the lowest and/or makes a very minor contribution to the risk value. The display screen can be configured to allow the user to move a cursor over individual edges or nodes and the platform will display a popup graphic providing details such as the risk score. For example, as shown, a user may have moved a cursor over and or "clicked" to select the node ABC Factory 714 in the display screen 1800. In response, the system displays information and potentially related research in the display screen such as displaying the exposure score by way of a number and/or a bar (such as that shown in FIGS. 16 and 17) in close visual association on the screen with the associated node ("clicked" or selected node). As shown, ABC Factory 714 is listed in the display panel 1810 and information about that entity is retrieved and presented below the entity in the panel 1810. The display panel 1810 shows that ABC Factory has connections in area 780 (each of which is selectable. For example, as shown, selecting "4 corridors" results in the popup 794 being displayed that lists the four corridors. The display panel 1810 also includes the country and information about other names for ABC Factory. Other information can be retrieved and displayed. Display area 1820 is configured to be a visual workspace that permits the user to interact with the displayed subgraph. In the visual workspace, the user can select to add nodes, corridors, or connections to the visual workspace. This can be done for example by selecting one of the listed corridors such as Person A. In another scenario, the visual indicator displayed in close association on the screen with a node can be selectable to add an associated subgraph such as when the exposure score is displayed next to the node. When added, the system is configured to automatically illustrate and connect new nodes being added to the nodes already in the visual workspace. For example, the system can display a selected corridor for a node of interest and can further allow the user via the interface to select a node in the displayed corridor, and in response to such a selection, the system can display an exposure score. The system can be further configured to allow the user to interact with the displayed subgraph such as taking an action that is applied to the displayed exposure score that in response, causes the system to add the risk subgraph, as part of the cognition feature, for a particular category to the display screen. Thus, for example, showing a corridor subgraph connected to a "cognition" subgraph. The system can automatically connect directly linked nodes in the two subgraphs together when the subgraph is added. These features can be subject to filters if desired such as controlling which direct links are displayed when a node or subgraph is added to a display screen. This for example highlights the creative and investigative aspects of the interactive workspace and also highlights the potential heightened value of the two features (cognition and corridors) simultaneously available as tools for the user if the desired.

If desired, the displayed edges or nodes can be subject to a graphical emphasis or deemphasis (darker or lighter colors) to demonstrate that strength of contribution in different paths to the target using the described calculations that arrive at the exposure score.

As discussed above, the risk propagation rules can include additional processes that adjust or refine the determined risk values (from the process described in FIGS. 9-15). For example, as discussed, the determined risk value can be reviewed by an expert and/or be the subject of a learning algorithm that revises the risk value.

The results generated from executing the above methods or traversal processes can be accessed and shown via an interface of the system such as the visual interactive interface in the production environment.

As described above, the customer platform may include a visual workspace and interactive tools in communication with the graph database. The visual workspace may be implemented as a stand-alone application executing on a computer system of the customer and accessing the graph database. In some examples, the visual workspace is web-based, e.g., executing on a page of a web browser. In this case, the web server (e.g., in environment 120) may access the graph database. The graph database may be configured to store nodes and edges for customers' use in the production environment and store visual graphs produced and saved by customers. In some examples, the interactive tools are provided for customers to research and map the commercial, financial, and facilitation networks of nodes of interest and associated actors such as sanctioned or other actors that may be associated with illicit activity, as described above. Furthermore, the interactive tools may be enhanced by subgraphs including one or more target nodes and one or more source nodes as described herein.

The system may be implemented using Internet protocols that make it compatible with web browsers generally available to the public (ubiquitous) so that user can quickly access and engage with the system.

All of the above methods may be performed by the software engine, which is a software component of the system. The traversal process can be implemented sequentially, in parallel, or combinations thereof.

The results from the above methods and traversal processes can be generated on demand or live. The results can be generated only when users query a node, instead of pre-generating the results and storing the results in the database waiting for users to access them. The above methods and associated-node identification process can also be performed with no human involvement or with minimum human involvement. For example, the research data may be automatically gathered and populated by the system or other computer systems, the data, such as a sanctions list, may be automatically collected and processed by the system or other computer systems, and the traversal processes between nodes and associated nodes may be automatically performed by the system or other computer systems.

Each of the system 100, the production environments, the graph databases, and the subsystems can be implemented on one or more computer systems and be configured to communicate via a network connection. They all may also be implemented on one single computer system. In either situation, the computer system(s) can communicate with customers' client devices. The computer system(s) may also be referred to as servers. It should be understood that variations are contemplated.

As mentioned, there is a significant volume of information in the field of financial, trade, and business-related risks including sanctions and financial crime compliance and there is a need to solve problems related to the user interface including the display and organization of information to provide a better electronic interactive investigational tool, that is addressed by embodiments of the present invention. For example, there are configurations and operational decisions that can provide a better tool without being too complicated (in use or visual presentation), slow, or overwhelming. The system needs to be able to aid the user and in so doing provide a balance between allowing the user to freely (self-directed) conduct investigations (interactive use of data) on their own and the flexibility and quickness to find the germane investigational informational content, directions, or research. In general, the configuration and operation of the interactive graphical user interface is important to provide a strong investigation tool that gains broad adoption.

With respect to the cognition feature, in some embodiments, it is contemplated that the feature is configured as an investigative software tool for quantifying the propagation of a topic or theme, according to a propagation model, from seed nodes in a graph database to a target node. For example, in the field of environmental, social, and governance standards ("ESG"), various ESG related topics can be applied to the graph database to determine an exposure score of a target node from seed nodes (e.g., certain entities working with forced labor). As such, in some embodiments, topics or themes can be implemented to model propagating exposure for that topic or theme at the target node. The topic or theme can have uses or applications other than business risk from financial crimes or sanctions.

If desired, the risk propagation framework (and the cognition feature) can be configured by the system to be portable or applied to external datasets. For example, the risk propagation framework can be saved and then provided to another company to apply to their private dataset. This aspect can, for example, be an add-on feature that the system can provide as a service.

In some embodiments, the system is configured to receive from a customer a new dataset such as, a dataset that contains entities that are of interest to that customer, which can include entities that the customer is (independently) researching or tracking. The system can be configured to receive the dataset (e.g., using a standard file format such as a standard table format as an import into the system) and apply a process that aligns the customer's dataset with the system's graph database. This can include performing an operation that determines which nodes in the system's database match the entities in the customer's dataset. Once aligned, the system can be configured to provide exposure scores for different categories for the customer's list (for each matching entity in the customer's dataset). The system can display such information (on a graphical user interface) or provide a report (send a file) that the customer can integrate into the customer's system. In some embodiments, if desired, the customer's dataset may include entities that are not in the system's graph database. In some embodiments, the system can be configured by way of an API, remote processing or software module to export and integrate the cognition feature into the customer's (private)

dataset. With this enhancement for example, the customer can apply the risk propagation and risk value determination features, as describe herein, to privately generate the customer's own risk values based on the customer's dataset (which may already include the risk values obtained from aligning the customer's dataset. The customer's full dataset may be private and may include information, entities, or relationships that are not known (saved) in the system's database because of the customer's research. The additional data can result in custom customer risk values and analysis. In some embodiments, the system can be configured to apply an operation to add the entities known by the customer to the graph database and perform risk propagation (or update the system's risk propagation) using the expanded graph database including the customers (new) entities, and generate new exposure scores for the nodes in the graph database. The new exposure scores can be provided to the customer. If desired the new exposure scores could be separately stored such as to maintain the original exposure score without the expanded graph. Process 400 can be configured to include the supporting software aspects for these cross-dataset aspects of the cognition feature.

With respect to the cognition feature, one or more objectives is to provide an emulation of the risk propagation as expected to be determined by experts and to do so using a quick and efficient process to determine the exposure score. As such, in some embodiments, the process consists essentially of the process described in connection with FIGS. 9-12 and 15 to perform the propagation and determine the exposure score.

The term platform is being used herein to refer to software implemented set of processes and operations that together provide an operating solution to users and is a foundation for using or adding tools or features for a particular field of endeavor or application.

In one embodiment, the computer system includes a bus or other communication mechanism for communicating information, and a hardware processor coupled with bus for processing information. Hardware processor may be, for example, a general-purpose microprocessor.

The computer system also includes a main memory, such as a random-access memory (RAM) or other dynamic storage device, coupled to bus for storing information and instructions to be executed by processor. Main memory also may be used for storing temporary variables or other intermediate information during execution of instructions to be executed by processor. Such instructions, when stored in non-transitory storage media accessible to processor, render computer system into a special-purpose machine that is customized to perform the operations specified in the instructions.

Computer system further includes a read only memory (ROM) or other static storage device coupled to bus for storing static information and instructions for processor. A storage device, such as a magnetic disk or optical disk, is provided and coupled to bus for storing information and instructions.

Computer system may be coupled via bus to a display, such as a cathode ray tube (CRT), for displaying information to a computer user. An input device, including alphanumeric and other keys, is coupled to bus for communicating information and command selections to processor. Another type of user input device is cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

Computer system may implement the techniques described herein using customized hard-wired logic, one or more ASICs or FPGAs, firmware and/or program logic which in combination with the computer system causes or programs computer system to be a special-purpose machine. According to one embodiment, the techniques herein are performed by computer system in response to processor executing one or more sequences of one or more instructions contained in main memory. Such instructions may be read into main memory from another storage medium, such as storage device. Execution of the sequences of instructions contained in main memory causes processor to perform the process steps described herein. In alternative embodiments, hard-wired circuitry may be used in place of or in combination with software instructions.

The term storage media as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device. Volatile media includes dynamic memory, such as main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications.

Various forms of media may be involved in carrying one or more sequences of one or more instructions to processor for execution. For example, the instructions may initially be carried on a magnetic disk or solid-state drive of a remote computer. The remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor retrieves and executes the instructions. The instructions received by main memory may optionally be stored on storage device either before or after execution by processor.

The computer system also includes a communication interface coupled to bus. Communication interface provides a two-way data communication coupling to a network link that is connected to a local network. For example, communication interface may be an integrated services digital network (ISDN) card, cable modem, satellite modem, or a modem to provide a data communication connection to a corresponding type of telephone line. As another example, communication interface may be a local area network (LAN) card to provide a data communication connection to a compatible LAN. Wireless links may also be implemented. In any such implementation, communication interface sends and receives electrical, electromagnetic or optical signals that carry digital data streams representing various types of information.

Network link typically provides data communication through one or more networks to other data devices. For instance, network link may provide a connection through local network to a host computer or to data equipment operated by an Internet Service Provider (ISP). ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication interface, which carry the digital data to and from computer system, are example forms of transmission media.

Computer system can send messages and receive data, including program code, through the network(s), network link and communication interface. In the Internet example, a server might transmit a requested code for an application program through Internet, ISP, local network and communication interface.

The received code may be executed by processor as it is received, and/or stored in storage device, or other non-volatile storage for later execution.

Embodiments described herein are primarily described in the context of providing a tool for evaluating prospective financial crime and sanctions-related risks for businesses considering commercial dealings, but it should be understood that applications in other areas including application of particular features in other areas are contemplated.

It is understood from the above description that the functionality and features of the systems, devices, or methods of embodiments of the present invention include generating and sending signals to accomplish the actions.

It should be understood that variations, clarifications, or modifications are contemplated. Applications of the technology to other fields are also contemplated.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the applications or systems illustratively described herein provide computer-implemented functionality that automatically performs a process or process steps unless the description explicitly describes user intervention or manual operation.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

Software can be implemented as distinct modules or software applications or can be integrated together into an overall application such as one that includes the user interface and that handles other features for providing the functionality to the user on their device.

The terms "may" or "can" are used herein to communicate, as a clarification, that, in context, the description is not limited to that specific embodiment.

It is intended that the specification and examples be considered as exemplary only, with a true scope being indicated by the claims and their equivalents.

The invention claimed is:

1. A computer implemented system for providing an interactive software tool that permits users to investigate and evaluate financial, trade, and business-related risks, comprising:

a computer system comprising a processor and non-transitory memory comprising computer-executable instructions to configure the computer system, wherein the computer system is configured to include:

a database, stored in nonvolatile memory and configured to store graph data structures comprising a plurality of different types of nodes, edges, and related properties that are used by the system to build a graph, wherein the related properties assigned to nodes include one or more risk categories and allow one or more of the nodes to be designated as seeds, wherein each seed is associated with risk category;

risk propagation engine that is configured to apply a process to the graph that assigns-a value for one of a plurality of assigned risk categories to a plurality of nodes, wherein the process comprises starting from individual seeds, traversing through the graph following one or more paths comprising connected nodes and edges, and determining an exposure score for the risk category at a node in the traversed path as a function of the value of the risk assigned to the starting seed and, in some instances, also as a function of one or more interrelationships between two or more risk categories;

an interactive graphical interface that is configured to,
display a visual workspace onto which the user can select to add one or more nodes, edges, or subgraphs,
display an option for the user to select one or more risk categories in association with the visual workspace, in response to a user (i) selecting a node to add to the visual workspace and (ii) selecting of one or more of the risk categories, display a subgraph, determined by the process, illustrating one or more paths of a selected risk category from one or more of the seeds, through nodes and edges and ending at the selected node, wherein one or more nodes have assigned related properties that include more than one risk category, and wherein the system is configured to add or receive new nodes or updates to the graph database and automatically applies the rule propagation engine to adjust values for risk for the risk category determined at the nodes.

2. The computer implemented system of claim 1 wherein the interactive graphical interface is configured to display two representations of the subgraph in which in a first representation the edges and nodes that together make up the subgraph are displayed and a second representation, based on an evaluation of the structure to eliminate paths, displays a simplified version of the subgraph.

3. The computer implemented system of claim 1 wherein the interactive graphic interface is configured to display an interactive list that identifies nodes and corresponding exposure score for the risk category.

4. The computer implemented system of claim 1 wherein the system is configured to add new risk categories to an existing node in the graph database.

5. The computer implemented system of claim 1 wherein the system is configured to select nodes to be target nodes and extract a subgraph starting from the seeds for a particular risk category to one of the target nodes.

6. The computer implemented system of claim 1 wherein the system is configured to implement a limit on a maximum number of nodes traversed in the traversal from one of the seeds.

7. The computer implemented system of claim 1 wherein the risk propagation engine is configured to assign different weights to edges based on edge type.

8. The computer implemented system of claim 1 wherein the function of one or more interrelationships between two or more risk categories is configured to detect whether the subgraph or traversed path includes an overlapping seed for another risk category and configures the risk propagation engine to apply a factor to the exposure score at that node that adjusts the exposure score.

9. A computer implemented method for providing an interactive software tool that permits users to investigate and evaluate financial, trade, and business-related risks, comprising:

Storing a database graph data structures comprising a plurality of different types of nodes, edges, and related properties that are used by the system to build a graph, wherein the related properties assigned to nodes include one or more risk categories and allow one or more of the nodes to be designated seeds, wherein each seed is associated with a risk category;

applying a process to the graph that assigns a value for one of a plurality of assigned risk categories to a plurality of nodes, wherein the process comprises starting from individual seeds, traversing through the graph following one or more paths comprising connected nodes and edges, and determining an exposure score for the risk category at a node in the traversed path as a function of the value of the risk assigned to the starting seed and, in some instances, also as a function of one or more interrelationships between two or more risk categories;

implementing an interactive graphical interface that is configured to, display a visual workspace onto which the user can select to add one or more nodes, edges, or subgraphs, display an option for the user to select one or more risk categories in association with the visual workspace, in response to a user (i) selecting a node to add to the visual workspace and (ii) selecting of one or more of the risk categories, display a subgraph, determined by the process, illustrating one or more paths of a selected risk category from one or more of the seeds, through nodes and edges and ending at the selected node wherein one or more nodes have assigned related properties that include more than one risk category, and wherein the method further comprising adding or receiving new nodes or updates to the graph database and automatically applying the process to adjust values for risk for the risk category determined at the nodes.

10. The computer implemented method of claim 9 comprising configuring the interactive graphical interface to display two representations of the subgraph in which in a first representation the edges and nodes that together make up the subgraph are displayed and a second representation, based on an evaluation of the structure to eliminate paths, displays a simplified version of the subgraph.

11. The computer implemented method of claim 9 comprising displaying using the interactive graphic interface an interactive list that identifies nodes and corresponding exposure score for the risk category.

12. The computer implemented method of claim 9 comprising adding new risk categories to an existing node in the graph database.

13. The computer implemented method of claim 9 comprising selecting nodes to be target nodes and extracting a subgraph starting from the seeds for a particular risk category to one of the target nodes.

14. The computer implemented method of claim 9 comprising implementing a limit on a maximum number of nodes traversed in the traversal from one of the seeds.

15. The computer implemented method of claim 9 comprising assigning different weights to edges based on edge type.

16. The computer implemented method of claim 9 wherein the function of one or more interrelationships between two or more risk categories comprises detecting whether the subgraph or traversed path includes an overlapping seed for another risk category and configuring the process to apply a factor to the exposure score at that node that adjusts the exposure score.

17. A non-transitory computer readable data medium storing computer-executable instructions that, when executed by a processor, cause the processor to perform operations comprising:

storing a database graph data structures comprising a plurality of different types of nodes, edges, and related properties that are used by the system to build a graph, wherein the related properties assigned to nodes include one or more risk categories and allow one or more of the nodes to be designated as seeds, wherein each seed is associated with a risk category;

applying a process to the graph that assigns a value for one of a plurality of assigned risk categories to a plurality of nodes, wherein the process comprises starting from individual seeds, traversing through the graph following one or more paths comprising connected nodes and edges, and determining an exposure score for the risk category at a node in the traversed path as a function of the value of the risk assigned to the starting seed and, in some instances, also as a function of one or more interrelationships between two or more risk categories;

implementing an interactive graphical interface that is configured to, display a visual workspace onto which the user can select to add one or more nodes, edges, or subgraphs, display an option for the user to select one or more risk categories in association with the visual workspace, in response to a user (i) selecting a node to add to the visual workspace and (ii) selecting of one or more of the risk categories, display a subgraph, determined by the process, illustrating one or more paths of a selected risk category from one or more of the seeds, through nodes and edges and ending at the selected node, wherein one or more nodes have assigned related properties that include more than one risk category, and wherein the operations further comprising adding or receiving new nodes or updates to the graph database and automatically applying the process to adjust values for risk for the risk category determined at the nodes.

18. The computer readable data medium of claim 17 comprising configuring the interactive graphical interface to display two representations of the subgraph in which in a first representation the edges and nodes that together make up the subgraph are displayed and a second representation, based on an evaluation of the structure to eliminate paths, displays a simplified version of the subgraph.

19. The computer readable data medium of claim 17 comprising displaying using the interactive graphic interface an interactive list that identifies nodes and corresponding exposure score for the risk category.

20. The computer readable data medium of claim 17 comprising adding new risk categories to an existing node in the graph database.

21. The computer readable data medium of claim 17 comprising selecting nodes to be target nodes and extracting a subgraph starting from the seeds for a particular risk category to one of the target nodes.

22. The computer readable data medium of claim 17 comprising implementing a limit on a maximum number of nodes traversed in the traversal from one of the seeds.

23. The computer readable data medium of claim 17 comprising assigning different weights to edges based on edge type.

24. The computer readable data medium of claim 17 wherein the function of one or more interrelationships between two or more risk categories comprises detecting whether the subgraph or traversed path includes an overlapping seed for another risk category and configuring the process to apply a factor to the exposure score at that node that adjusts the exposure score.

* * * * *